United States Patent
Eidelberg et al.

(10) Patent No.: US 8,876,182 B2
(45) Date of Patent: Nov. 4, 2014

(54) INTEGRATED TWO DIMENSIONAL ROBOTIC PALM FOR VARIABLE PITCH POSITIONING OF MULTIPLE TRANSFER DEVICES

(71) Applicant: FESTO Corporation, Hauppauge, NY (US)

(72) Inventors: Boaz Eidelberg, Smithtown, NY (US); Thomas Pilock, Rocky Point, NY (US); Matthew Quigley, Smithtown, NY (US); Patrick Haran, Holbrook, NY (US); Mustansir Faizullabhoy, Stony Brook, NY (US)

(73) Assignee: FESTO Corporation, Hauppauge, NY (US)

( * ) Notice: Subject to any disclaimer, the term of this patent is extended or adjusted under 35 U.S.C. 154(b) by 0 days.

(21) Appl. No.: 14/040,886

(22) Filed: Sep. 30, 2013

(65) Prior Publication Data

US 2014/0097629 A1    Apr. 10, 2014

Related U.S. Application Data

(60) Provisional application No. 61/708,127, filed on Oct. 1, 2012.

(51) Int. Cl.
*B25J 15/02* (2006.01)
*B66C 1/00* (2006.01)
*B25J 15/00* (2006.01)

(52) U.S. Cl.
CPC .............. *B66C 1/00* (2013.01); *B25J 15/0061* (2013.01)
USPC ..... 294/87.1; 294/65; 198/468.3; 414/416.02

(58) Field of Classification Search
USPC ........ 294/87.1, 87.12, 65; 414/416.02, 749.5; 198/468.3
See application file for complete search history.

(56) References Cited

U.S. PATENT DOCUMENTS

| | | | | |
|---|---|---|---|---|
| 2,903,290 | A * | 9/1959 | Morris et al. | 294/65 |
| 3,506,140 | A * | 4/1970 | Heinrich et al. | 414/736 |
| 3,542,412 | A * | 11/1970 | Heinrich et al. | 294/65 |
| 3,601,243 | A * | 8/1971 | Gurgacz | 198/430 |
| 3,610,673 | A * | 10/1971 | Strombeck et al. | 294/65 |
| 4,061,528 | A * | 12/1977 | Lingl | 156/561 |
| 4,901,504 | A | 2/1990 | Tsuji et al. | |
| 5,273,152 | A * | 12/1993 | Brun | 198/468.3 |
| 5,743,068 | A * | 4/1998 | Madariaga | 53/247 |
| 6,589,008 | B1 * | 7/2003 | Ingraham | 414/791.7 |
| 7,234,744 | B2 * | 6/2007 | Osten et al. | 294/65 |

FOREIGN PATENT DOCUMENTS

DE    202010001712 U1    7/2011
JP    3014418 A2    1/1991

* cited by examiner

*Primary Examiner* — Dean Kramer
(74) *Attorney, Agent, or Firm* — Hoffmann & Baron, LLP

(57) ABSTRACT

A handling device includes a base plate defining an X-Y plane, a plurality of X rails movably supported on the base plate and extending in an X-direction, a plurality of Y rails movably supported on the base plate and extending in a Y-direction perpendicular to the X-direction and a drive system supported on the base plate for moving the X rails in the Y-direction and for moving the Y rails in the X-direction, wherein a spacing between the X rails varies as the X rails move, and wherein a spacing between the Y rails varies as the Y rails move, and wherein the spacing between the X-rails is continuously variable with respect to the spacing between the Y rails.

21 Claims, 17 Drawing Sheets

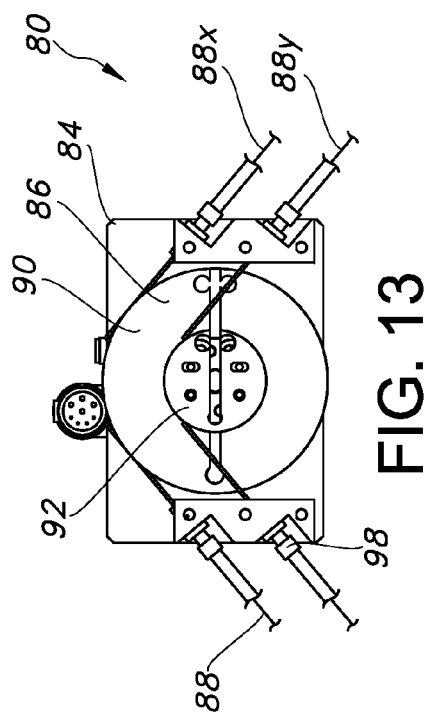
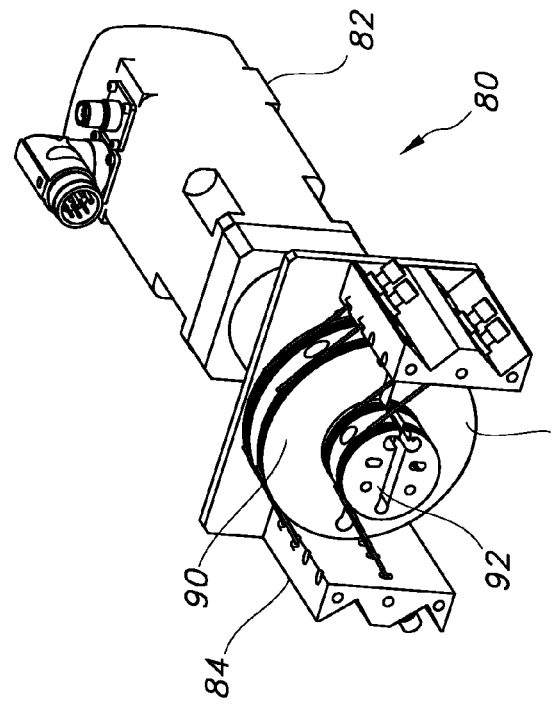
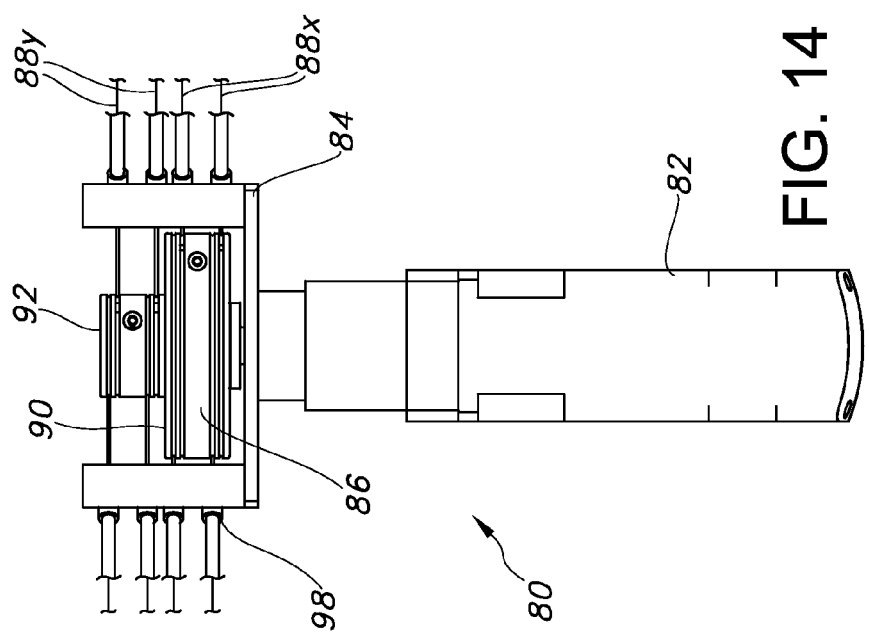

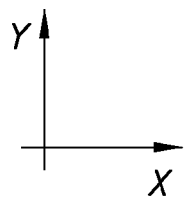
FIG. 17a
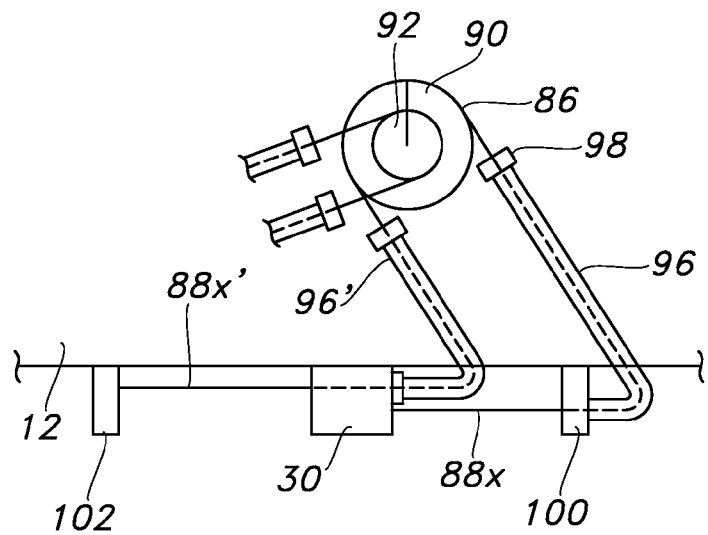
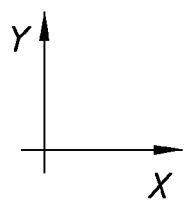
FIG. 17b
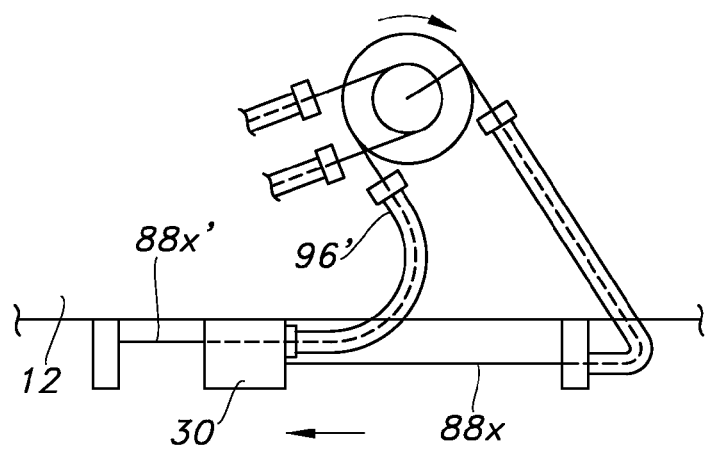
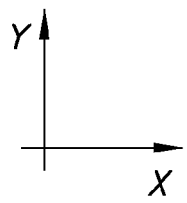
FIG. 17c
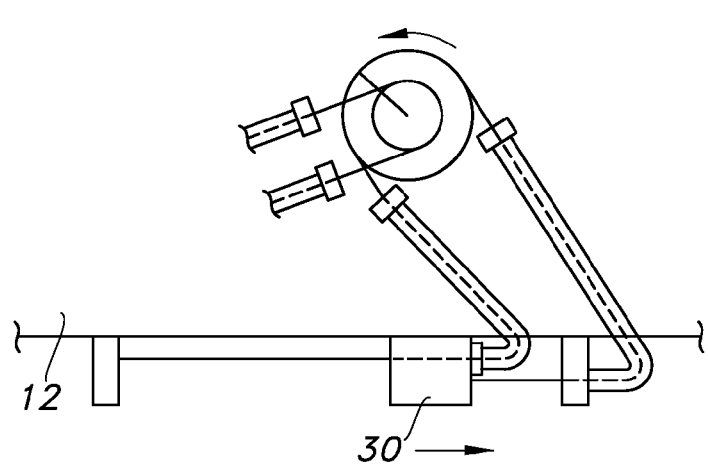

INTEGRATED TWO DIMENSIONAL ROBOTIC PALM FOR VARIABLE PITCH POSITIONING OF MULTIPLE TRANSFER DEVICES

CROSS-REFERENCE TO RELATED APPLICATIONS

This application claims the benefit of U.S. Provisional Application No. 61/708,127, filed on Oct. 1, 2012, the specification of which is incorporated by reference herein in its entirety for all purposes.

BACKGROUND

The present invention relates generally to automated handling systems and, more particularly, to a two dimensional robotic palm handling device providing variable spacing in the X and Y direction for a matrix of grippers.

Automated handling systems typically consist of three major high level parts: i) Robot; ii) Work; and iii) Tool. The robot could be any mechanical manipulator, (servo-controlled or manually assist), which can position a tool at a point within the robot working area in a desired orientation. Robots are applied in factory automation in many manipulation configurations, such as Cartesian, articulating, scara, tripods, hexapods, gantry.

The Work may be any product which is being worked on during manufacturing processes, such as machining, assembly, testing, inspection, packaging, sorting and handling. Examples of Work elements are engine machined parts, glass for TV screens, pc boards for cell phones, plastic bottles, food products etc.

The Tool is the element that applies energy to the part in the manufacturing process, which converts the part from raw material to a finished product. Examples of tools are machining bits, drills, cutters, lasers, water-jets, inkjet printer heads, painting nozzles and grippers.

In the analogy of robots to humans, the controller of the robot is the brain, the sensors are the nerves, the cameras are the eyes, the manipulator is the arms and legs, a gripper is the fingers and the element which manipulates a set of grippers is the palm. The objective of the gripper is to hold the Work during the manufacturing and handling process.

There are many types of grippers known in the art. These include parallel clamps, rotating clamps, magnetic and vacuum. Most grippers are used for picking individual Work units, while some gripper arrangements are used for picking multiple Work units. In applications involving multiple Work units, an array of grippers arranged in an XY matrix may be provided and a palm mechanism is required to synchronize their motion.

One example of such application involves the picking and placing of bottles of various sizes. In this case, an array of grippers may be arranged on a robotic palm handling device for simultaneously picking up a number of bottles. However, when the number or arrangement of bottles is changed, or if the size of the bottles varies, a new array of grippers must be replaced on the robotic palm handling device. This may result in plant downtime and may also require multiple tooling.

In other applications, analytic and diagnostic procedures in the laboratory often require the transfer of a plurality of samples, simultaneously, from one array of liquid-containing wells or test tubes to another. In order to transfer, add, collect or combine liquids, various multi-transferring systems have been devised. The most commonly used is a multi-pipette, which collects liquid from an array of source wells for transfer to an array of target wells, simultaneously, by application or release of application, respectively, of vacuum force. In operation, the pipette for collecting or releasing of liquid is connected to a single vacuum source provided to all the pipettes in the system so that all samples in the array of wells are collected and released at once.

However, often times the source wells or test tubes are arranged in a pallet with a certain spacing, suitable for loading, and it is necessary to transfer liquid or move test tubes to a different location, such as in an inspection device, wherein the target wells or test tubes have a different spacing.

To accomplish this, a robotic handling device, analogous to the human palm, may be provided to orient multiple grippers to pick up multiple work units, which are located in any oriented plane in space, with a certain spacing between them, and place them in another oriented plane within the work area with different spacing. There are several unidirectional devices known in the art that can change the spacing between grippers in a single X direction with variable spacing. Some prior art devices change the spacing between the grippers in the X and Y directions with a fixed ratio between the X and Y spacing.

Accordingly, it would be desirable to provide a handling palm device, which may be used in manufacturing and handling processes, to hold multiple grippers or holders, arranged as a matrix with uniform spacing in the X direction and uniform spacing in the Y direction, and then change the spacing of the grippers or holders to a different uniform value in X and a different uniform value in Y. It would be further desirable to provide an integrated XY system, which may change the individual X and Y spacing with a variable spacing ratio.

SUMMARY OF THE INVENTION

The handling device according to one aspect of the present invention generally includes a base plate defining an X-Y plane, a plurality X rails extending in the X direction and movably supported on the base plate and extending in an X-direction, a plurality of Y rails movably supported on the base plate and extending in a Y-direction perpendicular to the X-direction and a drive system supported on the base plate for moving the X rails in the Y-direction and for moving the Y rails in the X-direction, wherein a spacing between the X rails varies as the X rails move, and wherein a spacing between the Y rails varies as the Y rails move, and wherein the spacing between the X-rails is continuously variable with respect to the spacing between the Y rails.

There are preferably a plurality n of X rails, extending in the X direction and movably supported on two stationary Y rails, which are fixed to the base plate and extend in the Y-direction, a plurality m of Y rails, extending in the Y direction and movably supported on two X rails, which are fixed to the base plate and extend in the X direction and perpendicular to the Y-direction. Each one of the two fixed Y rails has n slides and each one of the two fixed X rails has m slides. Each one of the movable n X rails has m independent slides and each one of the movable m Y rails has n independent slides. The n X rails and the m Y rails form a matrix with n*m nodes of intersection. At each intersection node the slide of an X rail is connected to the associated slide on the Y rail. The total number of slide includes 2*(m+n)+n*m In a preferred embodiment, the handling device further includes an X scissors assembly connected between the drive system and the plurality of Y rails and a Y scissors assembly connected between the drive system and the plurality of X rails. The drive systems extend and collapse their respective scissors assembly for alternately, respectively increasing and decreasing the pitch spacing between their respective rails. Each of the X and Y scissors assemblies preferably includes a plurality of elongate link members pivotably connected with each other at pivot mid-point intersections thereof, wherein the X and Y rails are connected to the respective Y and X scissors assemblies at the pivot midpoint intersections of the elongate link members. In one embodiment, the X and Y scissors assemblies are respectively connected to ends of the Y and X rails and, in an alternative embodiment, the scissors assemblies are respectively connected to mid points of the Y and X rails.

Each X scissor has one pivot rigidly connected to the base plate or to one of the Y rails and another pivot rigidly connected to one of the Y rails. Each Y scissor has one pivot rigidly connected to the base plate or to one of the X rails and another pivot rigidly connected to one of the X rails.

The robotic palm handling device further preferably includes a sliding puck assembly movably coupled between each X rail and each Y rail at an intersection thereof and a transfer device supported by each sliding puck assembly for manipulating work. The transfer device can be a gripper, a pipette or a nozzle and can be attached to the sliding puck assembly via an angled bracket having an arm extending away from the sliding puck assembly for positioning the transfer device toward a center of the X and Y rails.

The sliding puck assembly preferably includes an X slide slidably coupled to the X rail and a Y slide slidably coupled to the Y rail. The sliding puck assembly further preferably includes a rigid U-shaped link having two parallel legs extending perpendicularly from a cross leg, wherein one of the two parallel legs has the X slide mounted thereto, the cross leg has the Y slide mounted thereto and the other of the two parallel legs has the transfer device mounted thereto.

The drive system preferably includes an X positioning table mounted to the base plate for moving the Y rails in the X direction and a Y positioning table mounted to the base plate for moving the X rails in the Y direction, wherein the Y positioning table is operable independently of the X positioning table for moving the X rails independent of the Y rails. Each of the X and Y positioning tables preferably includes an actuator having servo control for precise variable positioning to continuously variably extend or collapse the rails to any desired position between a fully extended position, wherein the pitch spacing between the rails is a maximum, and a fully collapsed position, wherein the pitch spacing between the X rails is a minimum. The actuator is preferably a servo motor device.

In an alternative embodiment, the drive system includes only a single actuator for driving both of the X rails and the Y rails. In one embodiment, this single actuator can include a drive element movable at an angle offset from the X and Y directions.

In a preferred alternative embodiment, the drive system includes a single motor supported on the base plate, at least one X cable connected between the motor and the plurality of Y rails for moving the Y rails in the X direction and at least one Y cable connected between the motor and the plurality of X rails for moving the X rails in the Y direction. In this case, the motor preferably includes a rotating drive wheel having a first disc portion with a first diameter and a second disc portion coaxially arranged with the first disc portion and having a second diameter, wherein the first diameter is different than the second diameter. The X cable can be attached to the first disc portion, while the Y cable is attached to the second disc portion.

The motor can drive the cables in several ways. In one embodiment, at least one pair of said X cables having one end attached to the motor and having an opposite end connected to the plurality of Y rails via a linear X drive mechanism is provided. The opposite ends of the pair of these X cables are respectively attached to opposite sides of the linear X drive mechanism for alternately pulling the X drive mechanism in opposite X directions.

In another embodiment, a first X cable, a second X cable, and a semi-rigid sleeve substantially surrounding a length of the second X cable is provided. The first X cable has one end attached to the motor and has an opposite end connected to the plurality of Y rails via a linear X drive mechanism. The opposite end of the first X cable is attached to a side of the linear drive mechanism for pulling the linear X drive mechanism in a first X direction. The second X cable has one end attached to the motor and has an opposite end attached to the base plate. The semi-rigid sleeve has one end fixed adjacent the motor and has an opposite end fixed to the same side of the linear drive mechanism for pushing the linear drive mechanism in a second X direction opposite the first X direction.

In both cases, semi-rigid sleeves can be provided for substantially surrounding a length of all cables. These other sleeves have one end fixed adjacent the motor and have an opposite end fixed to the base plate for supporting and guiding the cables in a desired direction and orientation.

In each one of the preferred robotic palm embodiments the X drive system has one or two X actuators, which drive one or two X scissors, which in turn position the Y rails in the X direction with equal pitch spacing between them, and the Y drive system has one or two Y actuators, which drive one or two Y scissors, which in turn drive the X rails in the Y direction with equal pitch spacing between them which is independent of the pitch spacing of the X rails.

The preferred embodiments of the handling device as well as other objects, features and advantages of this invention, will be apparent from the following detailed description, which is to be read in conjunction with the accompanying drawings. The scope of the invention will be pointed out in the claims.

BRIEF DESCRIPTION OF THE DRAWINGS

FIG. 13 is an end view of a rotary actuator drive assembly according to an alternative embodiment of the drive system.

FIG. 14 is a top view of the rotary actuator drive assembly shown in FIG. 13.

FIG. 15 is a perspective view of the rotary actuator drive assembly shown in FIGS. 13 and 14.

FIGS. 17a, 17b and 17c are schematic illustrations of a second embodiment of a drive system showing operation of the rotary drive assembly shown in FIGS. 13-15 and showing movement of a linear drive mechanism in its X direction.

DETAILED DESCRIPTION OF THE PREFERRED EMBODIMENTS

Figure 1:
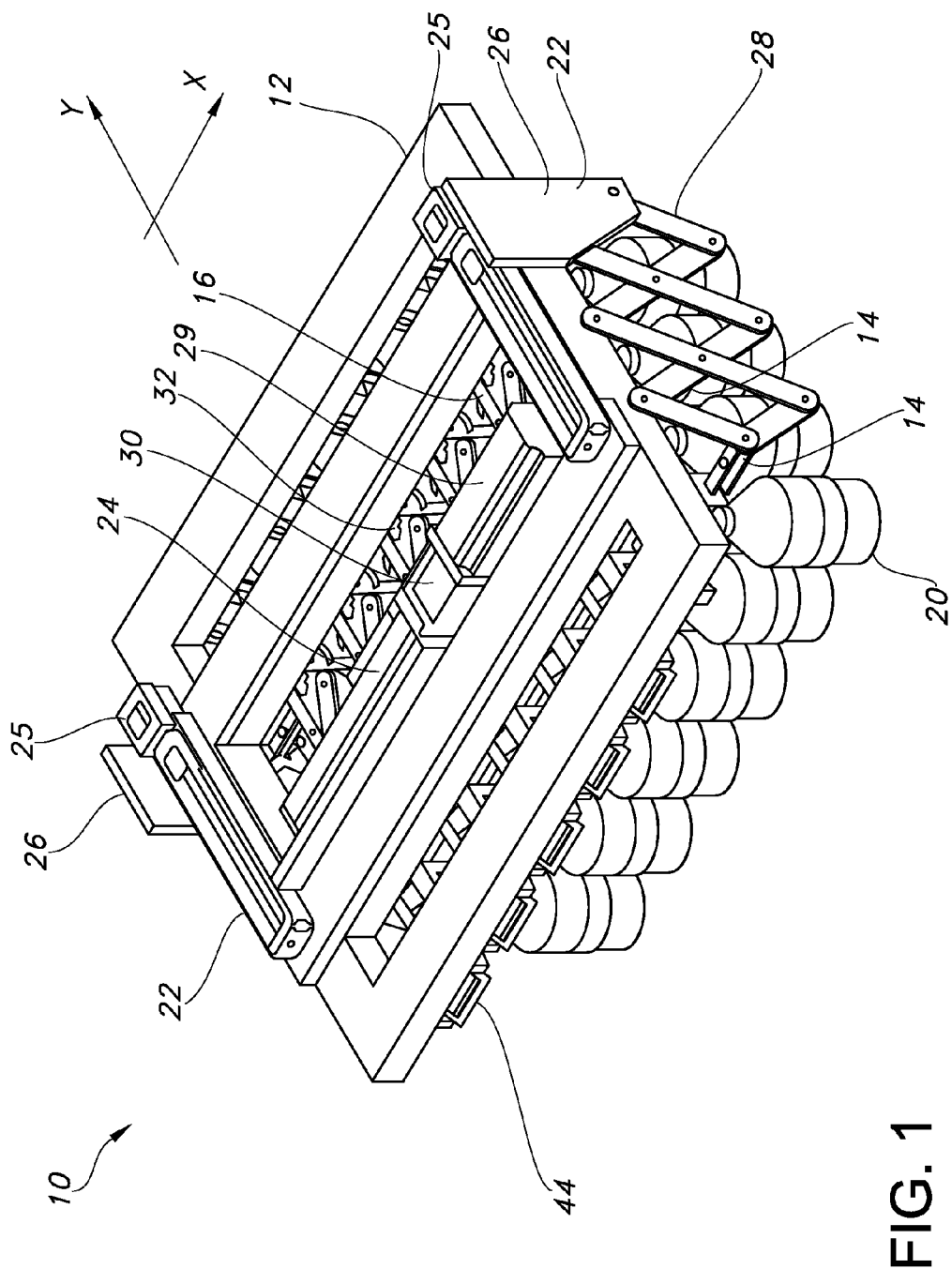
FIG. 1 is a top perspective view of the two dimensional robotic palm handling device formed in accordance with the present invention.
Figure 2:
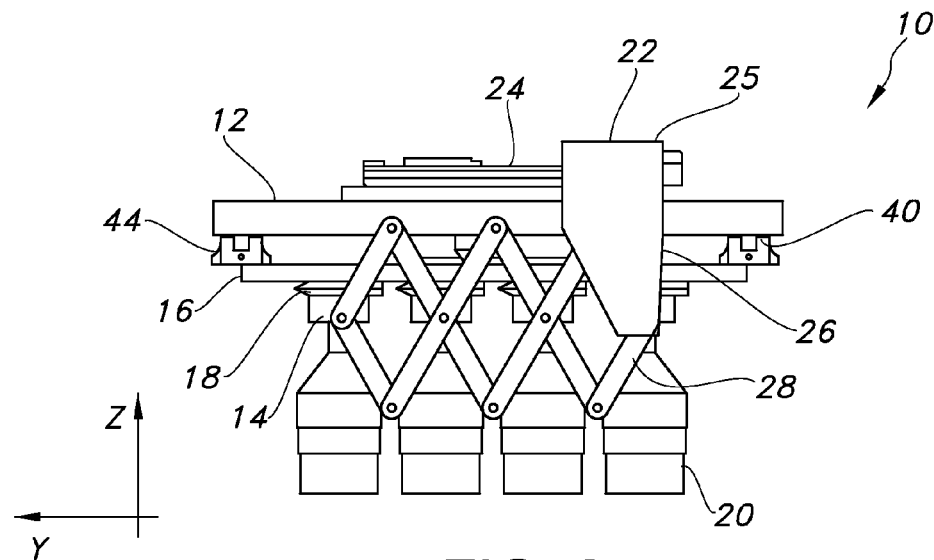
FIG. 2 is a side view of the robotic palm handling device shown in FIG. 1 looking in the X-direction.
Figure 3:
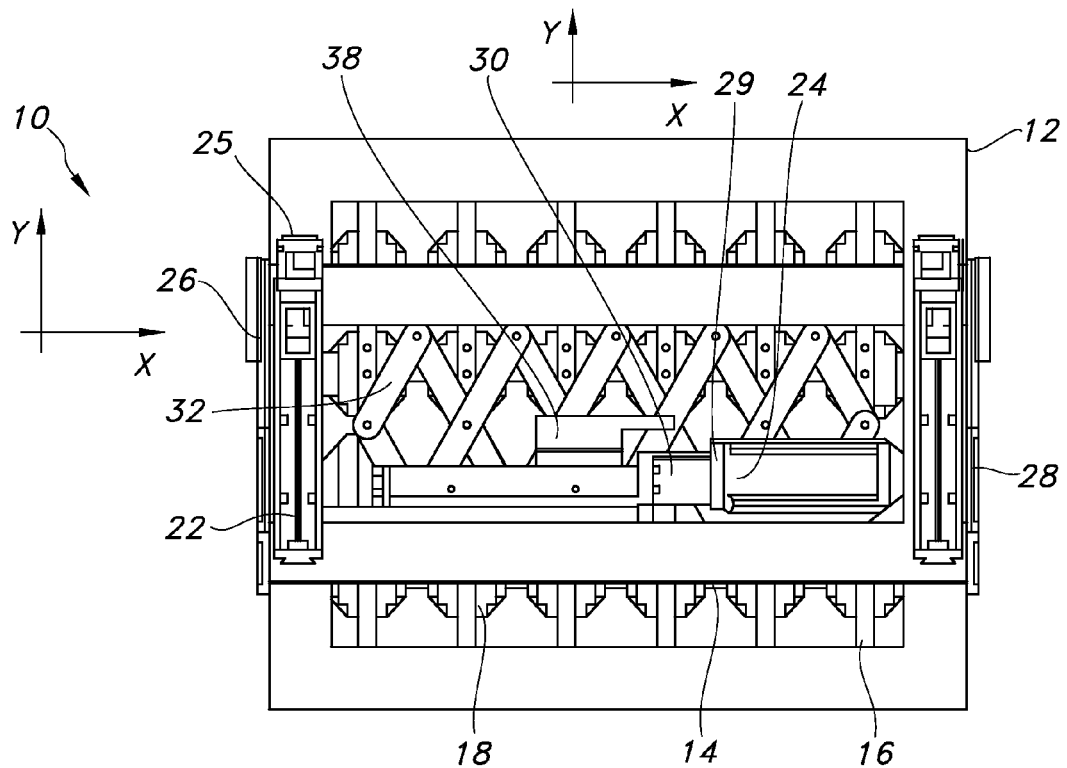
FIG. 3 is a top view of the robotic palm handling device shown in FIG. 1.

A two dimensional robotic palm handling device 10 of the present invention is shown in FIGS. 1-3. It should first be noted that in the following description the term "X rail" will be used to describe linear rail elements that extend in or are parallel to the X direction and the term "Y rail" will be used to describe linear rail elements that extend in or are parallel with the Y direction according to the X and Y axis shown in the drawings. The terms "X stage," "X scissors" and "X slides" will be used to describe elements or components that move in the X direction and the terms "Y stage," "Y scissors" and "Y slide" will be used to describe elements or components that move in the Y direction according to the X and Y axis shown in the drawings. It can be appreciated that the X and Y directions can be oriented in a different manner, whereby the X and Y terms will be reversed. The following description is made by a way of example such that any person which is familiar with the art can understand the construction and the principle of operation.

The robotic palm handling device 10 generally includes a base plate 12, which may be mounted to a robot manipulator (not shown) for moving the handling device 10 as desired or it may be mounted separately to a fixed base servicing moving XY positioning stages or conveyor belts with parts or fluid to be picked from a pallet or a container respectively with one XY pitch, and placed on a pallet or a conveyor at a different XY pitch.

Figure 5:
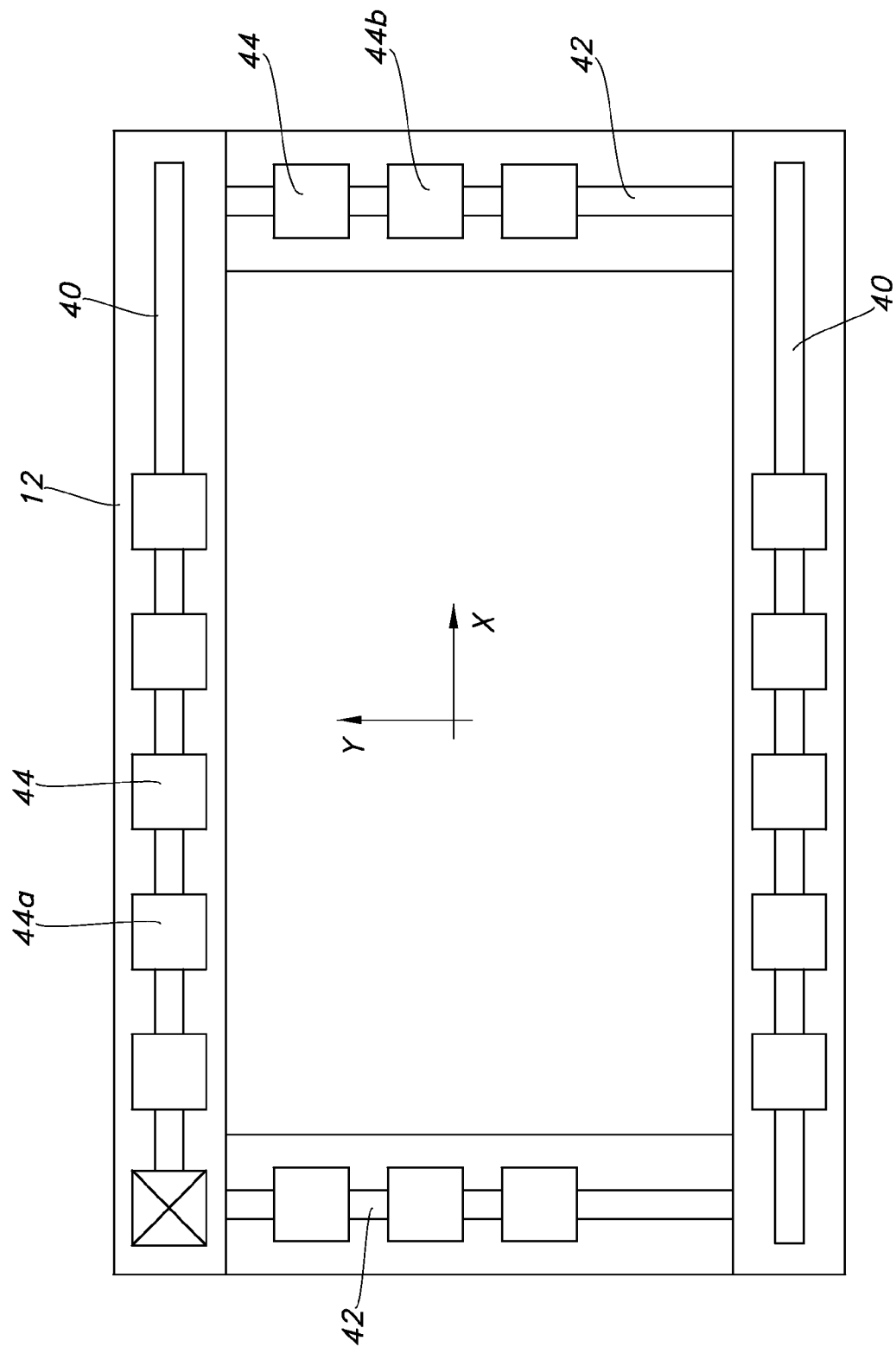
FIG. 5 is an isolated plan view of the base plate, two fixed X end rails and two fixed Y rails of the robotic palm handling device shown in FIG. 1.

The base plate 12 supports a set of two parallel fixed X rails 40 extending in the X-direction and rigidly attached to the base plate 12 (FIG. 5). The base plate also supports a set of two parallel fixed Y rails 42 (FIG. 5) extending in the Y direction and rigidly attached to base plate 12, and a set of parallel movable X rails 14 (FIG. 7) extending in the X direction and movable Y rails 16 (FIG. 7) extending perpendicular to the X rails in the Y direction. The moving rails, and the fixed stationary rails, which are fixed to the base plate, to be discussed in further detail below, can be of various types commonly used in industrial and lab automation including: recirculating, cam, air, rollers. FIGS. 1-3 show an embodiment of a robotic palm handling device 10 utilizing two fixed X rails 40, and four moving X rails 14 extending in the X direction and two fixed Y rails 42 (not shown in FIGS. 1-3) and six moving Y rails 16 extending in the Y direction. However, as will be discussed in further detail below, other matrix configurations are possible.

As will be described in further detail below, the moving X rails 14 are movably coupled to the moving Y rails 16 via a sliding puck assembly 18 at the intersection node of each X and Y rail. Connected to each sliding puck assembly 18 is a gripping transfer device 20 for manipulating work. The gripping transfer device 20 shown in FIGS. 1-3 and 17 is in the form of a gripper for picking and placing objects. The gripping transfer device 20 shown in FIGS. 9-12 is in the form of a pipette for transferring fluids. However, those skilled in the art will appreciate that the robotic palm handling device of the present invention may also be employed to control movement of any other gripping transferring devices to transfer samples, sensors, tools of various types or work pieces from one or more source locations to one or more target locations. Such other devices are intended to come within the scope of the invention.

The moving X rails 14 and the moving Y rails 16 are driven by a drive system to move the gripping transfer devices 20 into a desired matrix configuration having any variable X and Y pitch spacing. In the embodiment shown in FIGS. 1-3, the drive system includes two Y positioning tables 22 mounted to the base plate 12 for moving a Y scissors 28, which move the moving X rails 14 in the Y direction and an X positioning table 24 mounted to the base plate for moving an X scissors 32, which move the moving Y rails 16, which are connected to the X scissors, in the X direction.

The Y positioning table 22 includes an actuator 25, a linear drive mechanism 26 and a Y scissors assembly 28. The actuator 25 drives the linear drive mechanism 26 in the Y direction with respect to the base plate 12. The linear drive mechanism 26 is connected to the Y scissors assembly 28, which, in turn, is connected to the X rails 14. Similarly, the X positioning table 24 includes an actuator 29, a linear drive mechanism 30 and an X scissors assembly 32. The actuator 29 drives the drive mechanism 30 in the X direction with respect to the base plate 12. The linear drive mechanism 30 is connected to the X scissors assembly 32, which, in turn, is connected to the Y rails 16.

The scissors 28, 32 are preferably driven by a positioning table and actuator having servo control for precise variable positioning. In other words, the actuator can variably extend or collapse the scissors assembly to any desired position between its fully extended position and its fully collapsed position. The actuators can be any type of servo motor device and the drive mechanism can be ball screw driven, belt driven, air driven, rack and pinion driven, friction rod driven or can also be driven for manual adjustment with locks.

Figure 1A:
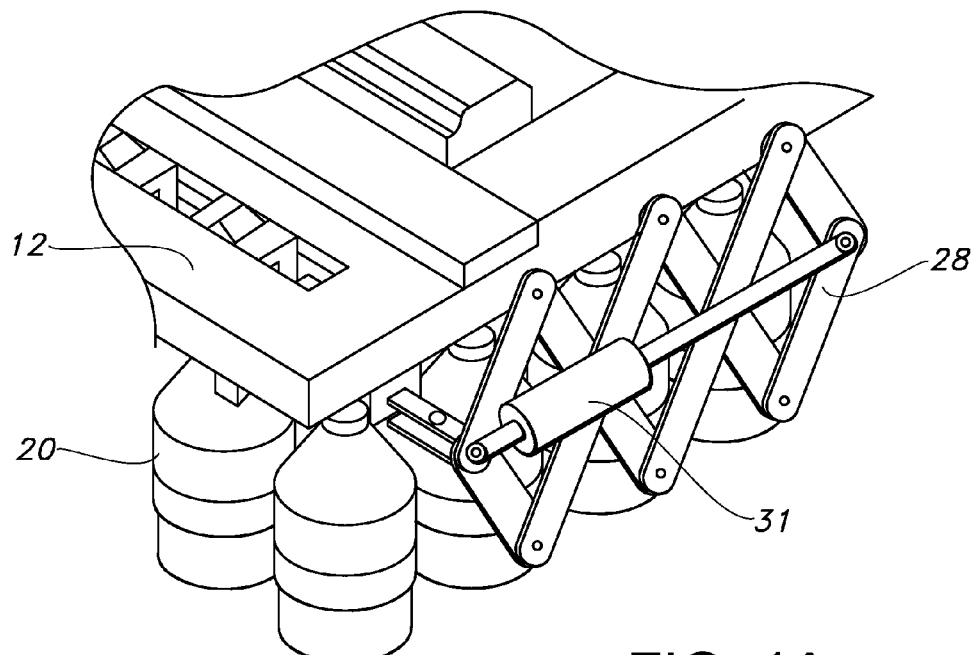
FIGS. 1A and 1B show alternative embodiments of the drive system for driving the scissors assemblies shown in FIG. 1.
Figure 1B:
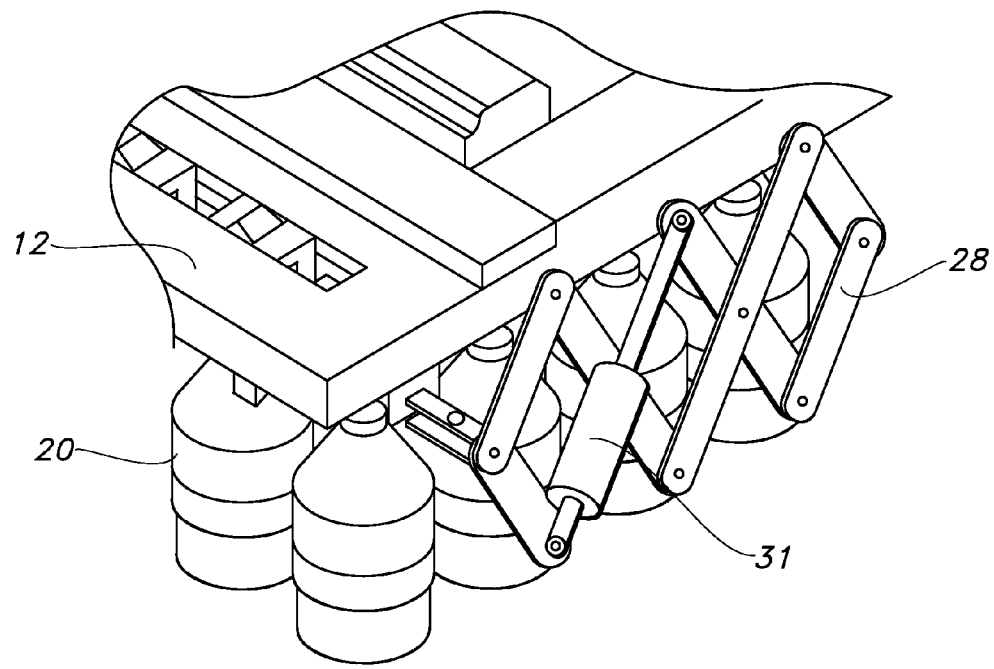

Moreover, the actuator and scissors arrangement can be chosen as desired in a way to optimize the operation of the robotic palm system for ideal force distribution within the scissors in order to minimize the difference in their gap (pitch) due to friction forces on the rails as they open and close. For example, FIGS. 1A and 1B show alternative actuators 31 in the form of air cylinders, which are attached at their opposite ends to the Y scissors 28 at an optimum location. Thus, the actuators 31 can be connected between any two pivot points on the scissors 28. It is further conceivable to use other actuators as well. The goal is to optimize the force distribution within the link members to result in even spacing between scissor links despite friction in the rails.

Figure 4:
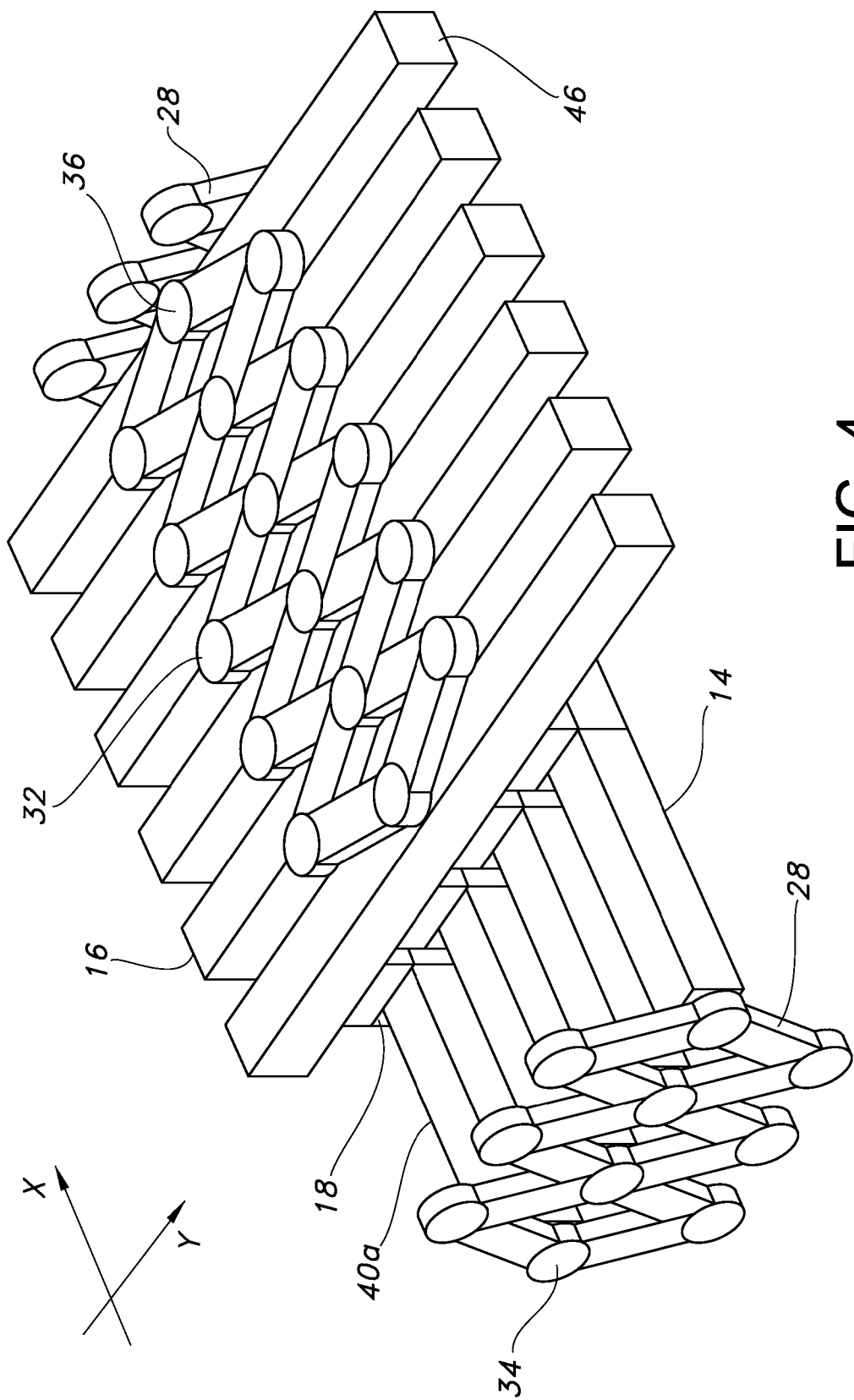
FIG. 4 is an isolated top perspective view of the rail and scissors assembly for moving the movable rails of the robotic palm handling device shown in FIG. 1.

Turning now to FIG. 4, each X and Y scissors assembly 32, 28 is conventionally constructed of a pair of planar elongate link members pivotably connected end to end, wherein the midpoint of each elongate link member of one set of connected elongate members is pivotably connected to the other set at the intersections of the elongate members. In this manner, the scissors assemblies can be collapsed into a retracted position, wherein the scissors have a minimal length, or can be elongated into an extended position, wherein the scissors have a maximum length.

As shown in FIGS. 1-4, two Y scissors assemblies 28 are used to drive the X rails 14, while only a single X scissors assembly 32 is used to drive the Y rails 16. In this embodiment, the intersections 34 of one of the two Y scissors assemblies 28 are fixed to respective ends of the X rails 14, while the intersections 34 of the other of the two Y scissors assemblies 28 are fixed to respective opposite ends of the X rails 14. On the other hand, each intersection 36 of the single X scissors assembly 32 is fixed to a midpoint of a respective Y rail 16.

Figure 10:
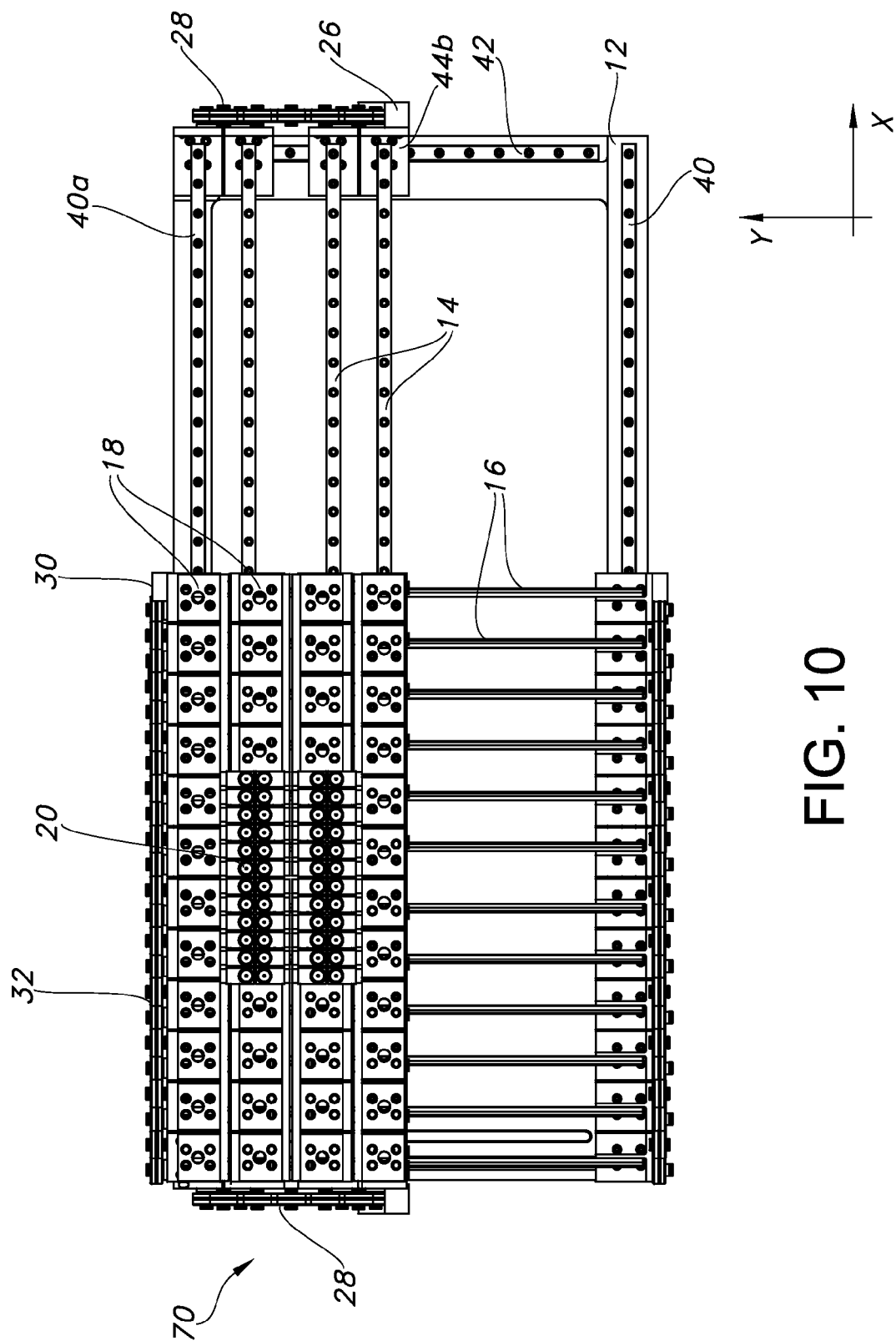
FIG. 10 is a plan view of an alternative embodiment of the palm handling device according to the present invention with fixed and movable rails installed and with sliding pucks installed.
Figure 11:
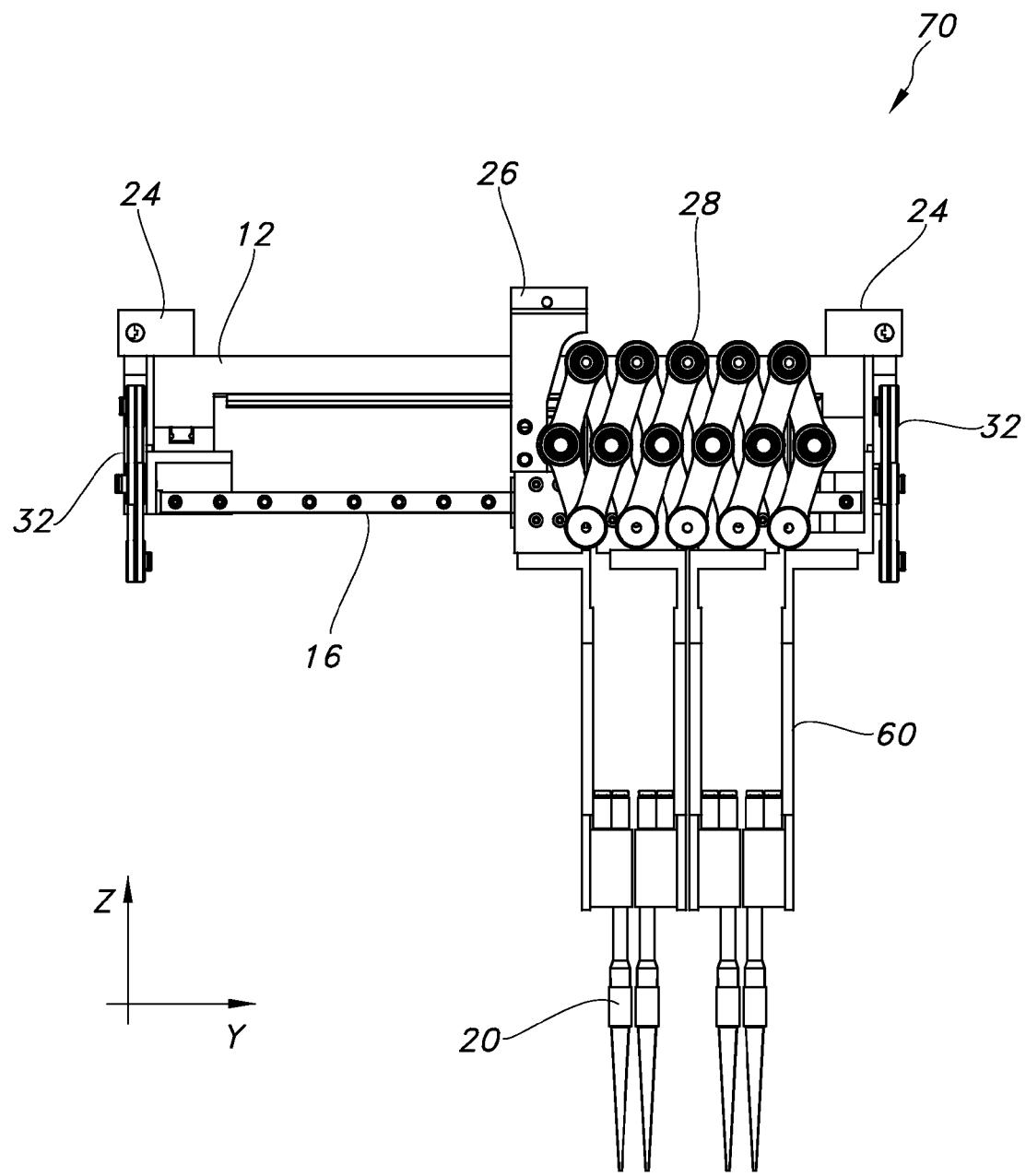
FIG. 11 is a side view of the handling device shown in FIG. 10 taken in the X-direction.
Figure 12:
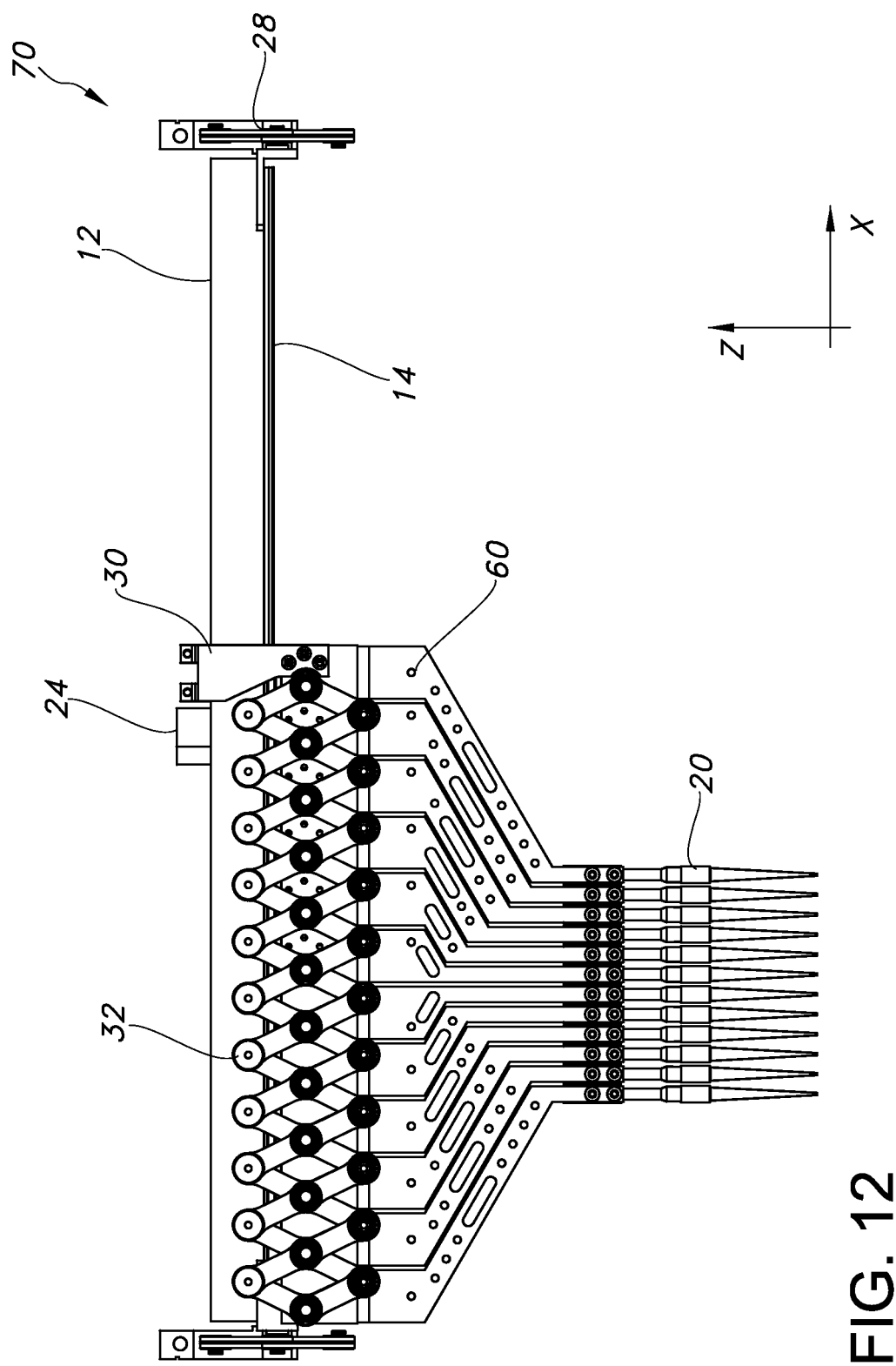
FIG. 12 is a side view of the handling device shown in FIG. 10 taken in the Y-direction.

Of course, this arrangement can be reversed, wherein a single Y scissor assembly 28 can be used with two X scissors assemblies 32. Furthermore, two Y scissor assemblies 28 can be connected to the opposite ends of the X rails 14, as shown in FIGS. 1-4, while two X scissor assemblies can be connected to opposite ends of the Y rails 16. This embodiment, in which two pairs of scissors assemblies are utilized for driving the rails, is shown in FIGS. 10-12.

When driven by their respective positioning tables, the Y drive mechanism 26 collapses or extends the Y scissors 28 in the Y direction for moving the X rails 14 in the Y direction, while the X drive mechanism 30 collapses or extends the X scissors 32 in the X direction for moving the Y rails 16 in the X direction for the purpose of uniform motion and driving force distribution as needed. Again, the joint intersection of each scissors is connected to a respective linear rail As the Y table 22 is commanded to move its Y drive mechanism 26 in the Y direction, the Y drive mechanism 26, which is connected to one of the joint intersection of the Y scissors 28, will change the spacing between the Y scissor joints 34 in the Y direction and will thereby carry their corresponding X rails with them. Similarly, as the X table 24 is commanded to move its drive mechanism 30 in the X direction, the X drive mechanism 30, which is connected to one of the joint intersection of the X scissors 32, through a connecting bracket 38, will change the spacing between the X scissor joints in the X direction and will thereby carry their corresponding Y rails with them. The net result is a change in position of the gripper transfer devices 20 in the XY plane with different spacing in the X and Y directions respectively.

The moving X and Y rails 14, 16 are supported on the base plate 12 via an arrangement of fixed rails 40, 42 and slides 44. Specifically, with additional reference to FIGS. 5 and 6, two stationary parallel X rails 40 are fixed to the table 12 on opposite sides of the table and extend in the X direction. Similarly, two stationary parallel Y rails 42 are fixed to the table 12 on opposite sides of the table and extend in the Y direction. Together, the pairs of stationary X and Y rails 40, 42 form a peripheral rectangle defining the bounds of movement for the movable X and Y rails 14, 16.

Slidably supported on each of the stationary X rails 40 are a plurality of X base slides 44a, movable in the X direction along the stationary X rail, and slidably supported on each stationary Y rail 42 are a plurality of Y base slides 44b, movable in the Y direction along the stationary Y rail. The slides can be standard slides used in industrial and laboratory automation, and which are designed for low friction sliding along rails. The fixed pair of X and Y rails 40, 42 maintains its respective X and Y slides in a fixed position with respect to the base plate 12.

The number of X slides 44a on each of the two stationary X rails 40 should be the same and the number of Y slides on each of the two stationary Y rails 42 should be the same. As will become evident in the further description below, each pair of opposite slides supports a movable rail of the handling device.

Figure 6:
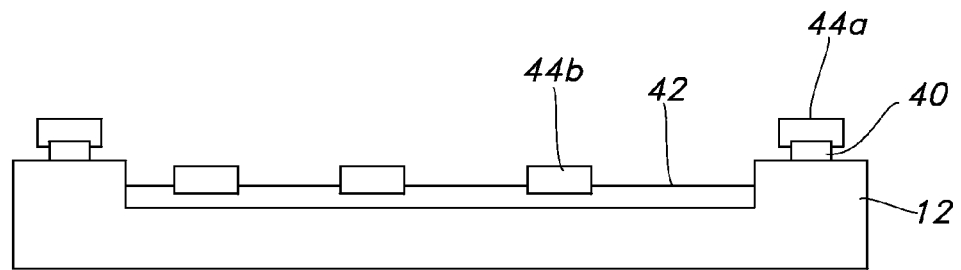
FIG. 6 is an isolated side view looking in the X direction of the plan view shown in FIG. 5 including the base plate, the two fixed end X rails and one of the two fixed Y rails shown in FIG. 5.
Figure 7:
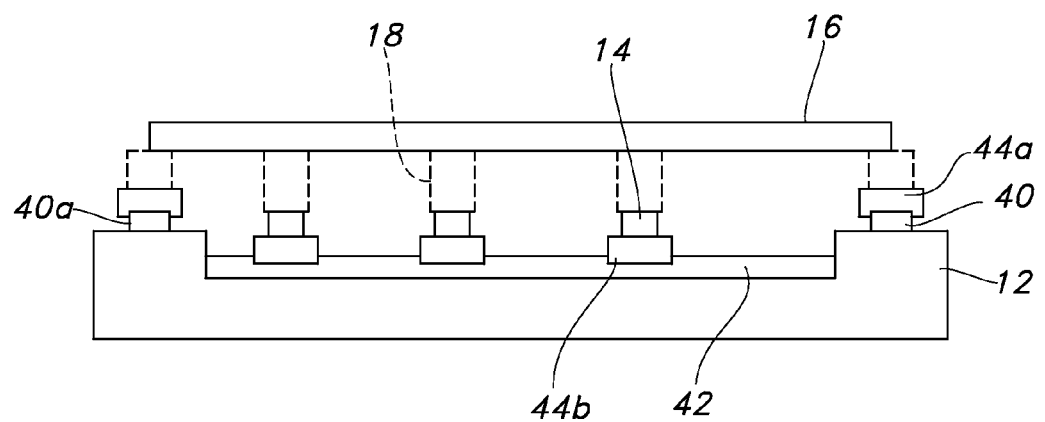
FIG. 7 is an isolated side view of the base plate, looking in the X direction with X and Y fixed rails, as shown in FIG. 6, with their respective movable X and Y rails installed on their sliders.
Figure 8:
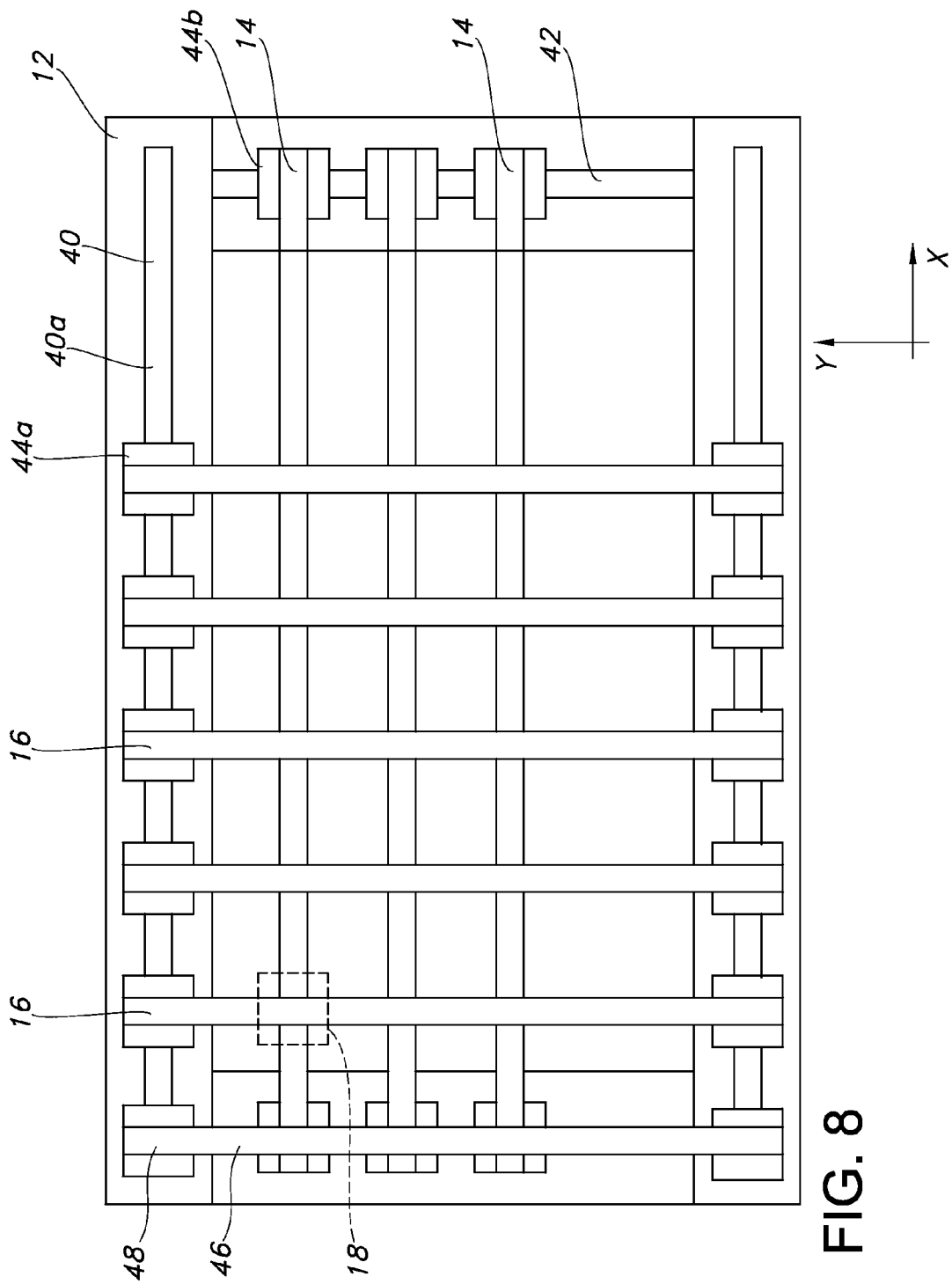
FIG. 8 is an isolated plan view of the base plate, fixed X and Y rails and their associated sliders shown in FIG. 6 with the movable rails installed on the sliders of the fixed rails.

Referring now to FIGS. 7 and 8, mounted on each X slide 44a is a movable Y rail 16 and mounted on each Y slide 44b is a movable X rail 14. So that the movable X rails 14 and the movable Y rails 16 do not interfere, the stationary X rails 40 and the stationary Y rails 42 can be mounted to the base plate 12 on different planes, as can be seen in FIGS. 6 and 7. Alternatively, in a different embodiment, the stationary X rails 40 and the stationary Y rails 42 can be mounted on the same plane of the base plate 12, where base slides 44a or base slides 44b have different heights to prevent movable Y rails 16 from interfering with moveable X rails 14. Each movable X rail 14 is mounted between a pair of opposing Y slides 44b, while each movable Y rail 16 is mounted between a pair of opposing X slides 44a. The result is a set of movable X rails 14 that can freely slide along the pair of stationary Y rails 42 in the Y direction and a set of movable Y rails 16 that can freely slide along the pair of stationary X rails 40 in the X direction.

In the embodiment shown in FIG. 7, the movable X rails 14 lie in the same plane as the stationary X rails 40. In this case, one of the stationary X rails 40a will serve to anchor the Y scissors assembly 28 for moving the movable X rails 14. Specifically, one of the intersections of the scissors assembly can be fixed to the stationary X rail, while the other intersections are fixed to the movable X rails. This stationary X rail 40a can also perform the same function as the movable X rails in supporting a set of gripper transfer devices 20 via puck assemblies. However, these transfer devices will be fixed in the Y direction.

In a similar manner, an additional stationary Y rail 46 is provided on the same plane as the movable Y rails 16 to anchor the X scissors assembly or assemblies 32. In addition, the stationary Y rail 46 can perform the same function as the movable Y rails, while maintaining a set of gripper transfer devices fixed in the X direction.

At the intersection of the one stationary X rail 40a and the additional stationary Y rail 46, a fixed base point 48 is established at one corner of the base plate 12. This base point 48 defines the location of one transfer device that is fixed in both the X and the Y directions. For such an embodiment the moving slides in both X and Y directions may be eliminated.

As mentioned above, each X rail 14, 40a is slidably coupled to each Y rail 16, 46 via a sliding puck assembly 18, (shown only schematically in dashed lines in FIGS. 7 and 8).

Figure 9:
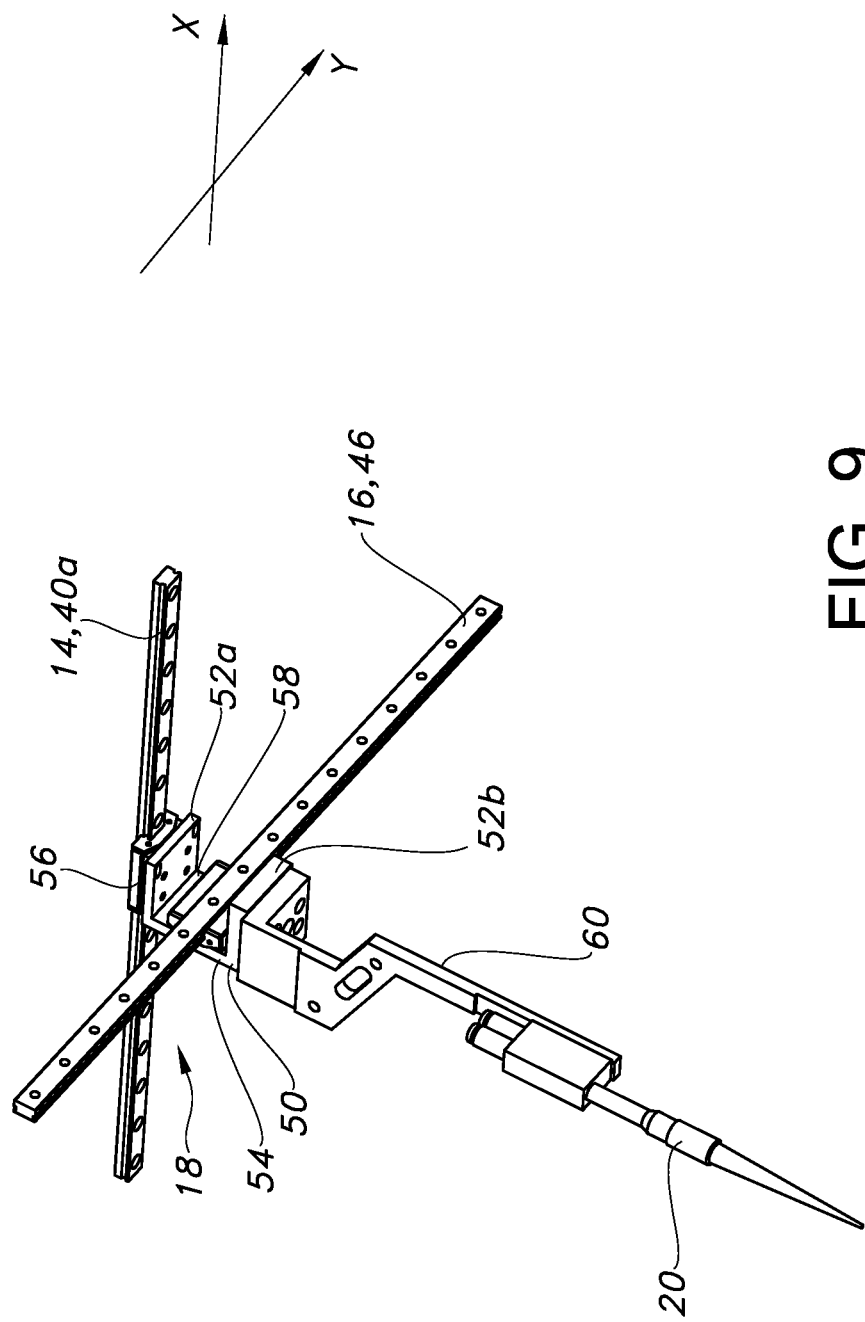
FIG. 9 is a perspective view of a sliding puck assembly coupled between two movable rails and having a transfer device in the form of a pipette attached thereto.

Further details of a preferred embodiment of the puck assembly 18 are shown in FIG. 9. The puck assembly 18 preferably includes a rigid U-shaped link 50 having two parallel legs 52a, 52b extending perpendicularly from a cross leg 54. When installed, the parallel legs 52a, 52b define mounting surfaces that are parallel with the base plate in the XY plane, while the cross leg 54 defines a mounting surface that is perpendicular to the base plate in the YZ plane.

Fixed to the mounting surface of one of the parallel legs 52a is an X rail puck slide 56, which, in turn, is slidably coupled to an X rail 14, 40a and movable in the X direction. Fixed to the mounting surface of the cross leg is a Y rail puck slide 58, which, in turn, is slidably coupled to a Y rail 16, 46 and movable in the Y direction. In this manner the puck assembly 18 is freely simultaneously traversable along both the X rail 14, 40a and the Y rail 16, 46 in both the X and Y directions. Inversely, the puck assembly 18 is free to move in the X direction with respect to the base plate (not shown in FIG. 9) along X rail 14, 40, when Y rail 16 is moving in the X direction, and in the Y direction along Y rail 16, 46, when X rail X 14 is moving in the Y direction.

Mounted to the mounting surface of the other parallel leg 52b, opposite the X rail puck slide 56 is the gripper transfer device 20. Attachment of the transfer device 20 can be from either direction and can be achieved with various attaching components such as bolts, brackets, angle bars, etc. Moreover, the transfer device and puck can be manufactured as a single integrated part with or without an integrated XY slide.

The gripper transfer device 20 shown in FIG. 9 is in the form of a pipette or nozzle, which can be fluidly connected with tubing (not shown) to supply a fluid to the pipette or nozzle. Other forms of gripper transfer devices, such as tool holders, sensors, vacuum suction cups or any other automated handling devices commonly used in the industry may be used as the gripper transfer device 20. The gripper transfer device 20 shown in FIG. 9 also includes a uniquely designed adapter bracket 60, which, when combined with other adapter brackets of other gripper transfer devices, greatly reduces the overall profile of the transfer device matrix, as will be discussed and shown later below.

Thus, a puck assembly 18 is provided at the intersection of each X rail 14, 40a and each Y rail 16, 46. Furthermore, a gripper transfer device 20 is mounted to each puck assembly 18 at each intersection. As can be appreciated, movement of the X and Y rails, via the respective X and Y tables and scissors assemblies, will move the gripper transfer devices in the X and Y directions with respect to the robotic palm base plate. By independently controlling the movement of the rails in the X and Y direction, the pitch spacing of the gripper transfer devices in the X direction can variably differ from the pitch spacing of the transfer devices in the Y direction.

It should be noted that the invention is not limited to the 4×6 rail arrangement with twenty-four gripper transfer devices 20, as shown in FIGS. 1-8. Thus, for example, FIGS. 10-12 show a handling device 70 having a 4×12 rail arrangement with forty-eight gripper transfer devices 20. In this embodiment, the arrangement and assembly of the various components are the same as described above, with the exception that twelve Y rails are provided instead of six. As can be appreciated, the matrix can vary in the number of rows and columns with respective change in robotic palm base plate size, scissor strength and gripper actuation power.

Here, an alternative manner of connecting the X scissors 32 is shown in FIGS. 10-12, wherein the intersections of the X scissors are connected to the ends of the Y rail 16. The scissors in both X Y directions can be in either horizontal or vertical orientation depending on the space requirements of the application. Furthermore, the location of contact of scissor and the rails, or more generally the rail beam support, can be either at the center joints of the scissors or at the end joints of the scissor. If the rails are connected to the scissor at the end joints of the scissors, a better straightness of travel may be resulted.

Also, the point of contact between the actuator 24, 22 of either X and Y direction respectively and their respective scissor in X and Y direction can be at any center joint of the scissor provided one joint is fixed to its base. The number of actuators 24, 22 in X and Y direction respectively for two independent motion in X and Y direction can be at least one. More actuators can be driven in parallel to increase force and improve driving force distribution.

FIGS. 10-12 also illustrate the benefits of the uniquely designed adapter bracket 60. Specifically, each adapter bracket 60 includes an arm having a length and oriented at an angle so as to offset the gripper transfer device in a direction toward the center of the matrix of X and Y rails. In this manner, all of the transfer devices 20 are gathered together in close proximity at one location with respect to the overall outline of the X and Y rail matrix. This greatly reduces the overall profile of the gripper transfer devices with respect to the size of the X and Y rail matrix.

Turning now to FIGS. 13-15, an alternative embodiment of an actuator 80 for driving the X and Y rails 14, 16 is shown. In this embodiment, the actuator includes a rotary motor 82, a cable guide bracket 84 fixed to the motor and a drive wheel 86 rotatably attached to the rotating shaft of the motor. As will be discussed in further detail below, the actuator 80 drives an arrangement of cables 88 for moving the X and Y rails 14, 16.

The actuator shown in FIGS. 13-15, and in the schematic illustrations that follow, is a rotary actuator using a circular drive wheel 86 for translating the cables 88 in a desired direction. However, it is conceivable to substitute the rotary actuator with a linear actuator with corresponding structurally adapted drive mechanisms to achieve the same desired cable translation. For example, alternative actuators can be any type of servo motor device and the drive mechanism can be ball screw driven, belt driven, air driven, rack and pinion driven, friction rod driven or can also be driven for manual adjustment with locks.

In a preferred embodiment, the actuator 80 drives an arrangement of eight cables 88, wherein two pairs of X cables 88x drive the Y rails in the X direction and two pairs of Y cables 88y drive the X rails in the Y direction, as will be discussed in further detail below. Preferably, one pair of X cables 88x drives the X linear drive mechanism 30 connected to one of the two X scissors assembly 32 and the other pair of X cables 88x drives the X linear drive mechanism 30 connected to the opposite X scissors assembly 32. Similarly, one pair of Y cables 88y drives the Y linear drive mechanism 26 connected to one of the two Y scissors assembly 28 and the other pair of Y cables 88y drives the Y linear drive mechanism 26 connected to the opposite Y scissors assembly 28.

Each of the cables of the two pairs of X cables 88x is fixed at one end to one of two circular disc portions 90, 92 of the drive wheel 86, while each of the cables of the two pairs of Y cables 88y is fixed at one end to the other of the two circular disc portions of the drive wheel. In particular, the drive wheel 86 has two circular disc portions 90, 92 disposed in coaxial relationship with each other. The outer peripheral surface of each circular disc portion 90, 92 is formed with at least one annular groove 94 for seating a respective cable 88. Preferably, each circular disc portion 90, 92 also includes provisions for securing an end of the cable 88 to the respective disc portion. These provisions can take the form of a notch 94 (see FIG. 19) or undercut slot for attaching the end of a cable to the disc portion.

The disc portions 90, 92 have different diameters. In the embodiment shown in FIGS. 13-15, and in the schematic illustrations that follow, the disc portion 90 has a larger diameter than the disc portion 92 and is disposed closer to the motor 82. As will be discussed in further detail below, the difference in the diameters of the disc portions will determine the difference in the spacing of the X rails with respect to the spacing of the Y rails. More specifically, as the drive wheel 86 rotates, a point on an X cable 88x attached to the larger disc portion 90, for example, will travel a greater distance as compared to a point on a Y cable 88y attached to the smaller disc portion 92.

Each of the cables 88 is provided with a tubular cable sleeve 96, which provides rigidity to the cable and directs the cable in a desired direction. Each cable sleeve 96 is attached at one end to the cable guide bracket 84 and defines a cable duct for receiving and guiding the cable 88. The cable guide bracket 84 has cable through holes (not shown) that allow passage of the cables 88 through the bracket from the drive wheel 86 into the sleeve 96. Attachment of the cable sleeve to the bracket 84 is preferably via a threaded adapter 98 so that tension of the sleeve 96 can be adjusted by simply rotating the adapter. The opposite end of the sleeve 96 can be attached in several ways, depending on the desired embodiment of the drive system, as will be discussed in further detail below.

Figure 16A:
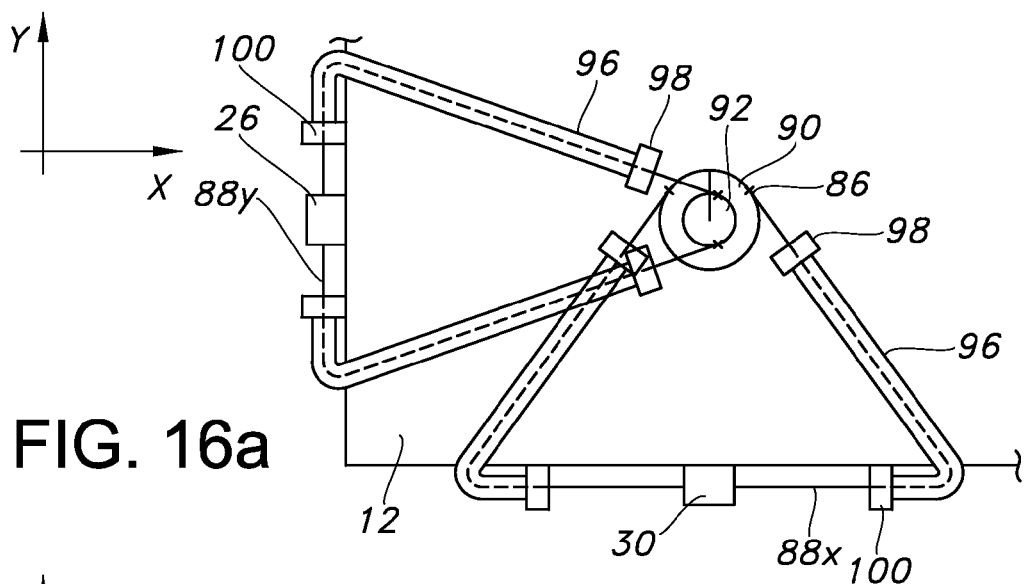
FIGS. 16a, 16b and 16c are schematic illustrations of a first embodiment of a drive system showing operation of the rotary drive assembly shown in FIGS. 13-15 and showing movement of the linear drive mechanisms in their respective X and Y directions.
Figure 16B:
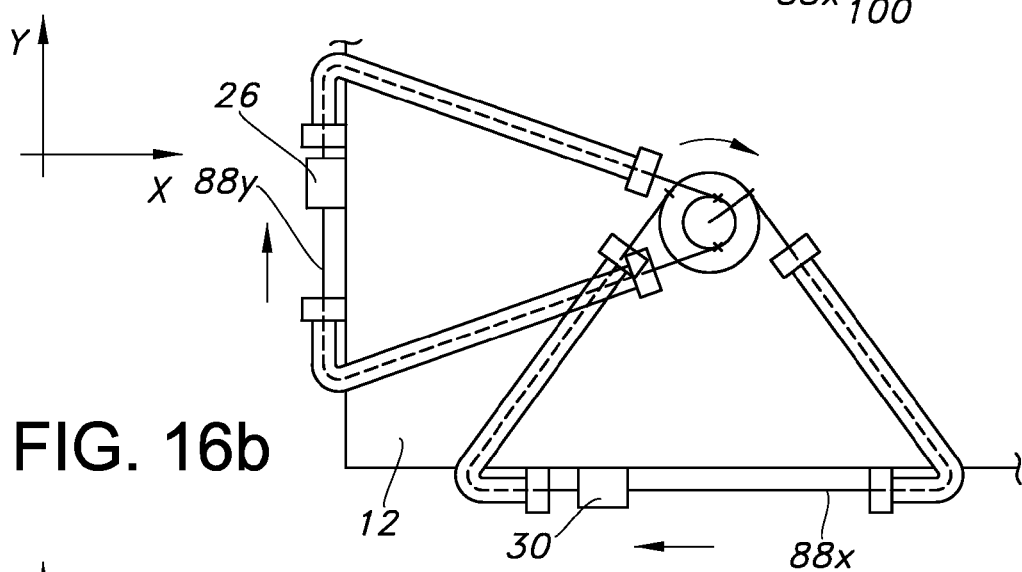
Figure 16C:
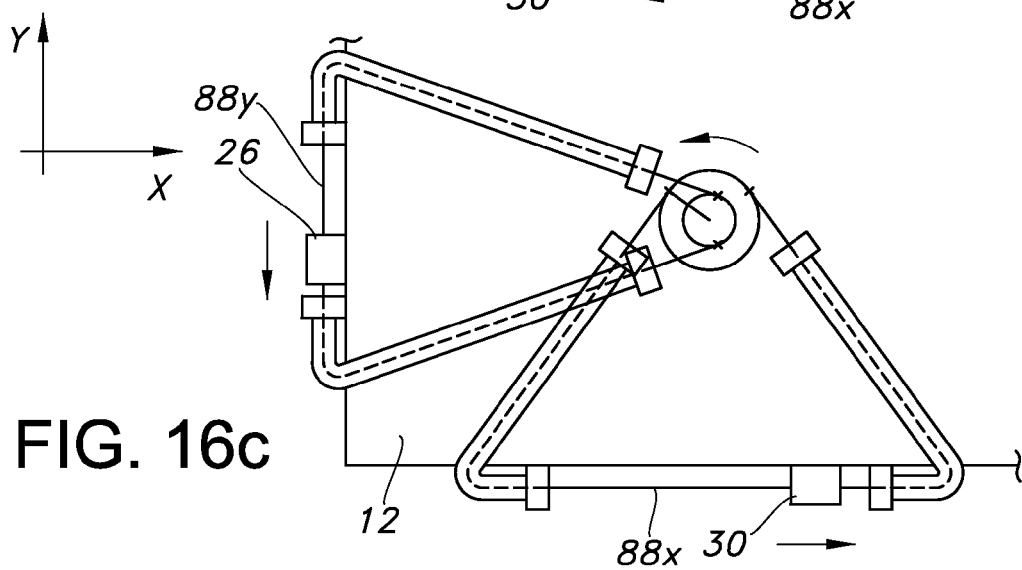

In a first embodiment shown in FIGS. 16a, 16b, 16c, each cable sleeve 96 is attached at one end to the threaded adapter 98 of the actuator cable guide bracket 84, as described above. The opposite end of the cable sleeve 96 is attached to a cable guide flange 100 fixed to the base plate 12. A cable guide flange 100 is provided on opposite sides of each of the X drive mechanisms 30 and on opposite sides of each of the Y drive mechanisms 26. Each cable guide flange 100 has a through hole so that each one of each pair of cables can traverse through the flange to be connected to opposite sides of a respective X and Y drive mechanism.

FIGS. 16a, 16b and FIG. 16c show only one pair of X cables 88x attached at opposite ends of an X drive mechanism 30 and only one pair of Y cables 88y attached at opposite ends of a Y drive mechanism 26. However, it is contemplated that a second pair of X cables 88x would be attached at opposite ends of an X drive mechanism 30 positioned on the opposite side of the base plate 12 and a second pair of Y cables 88y attached at opposite ends of a Y drive mechanism 26.

Attachment of the cable sleeves 96 to the cable guide flange 100 of the base plate 12 is preferably achieved via a threaded adapter 98, as described above, so that tension or compression of the sleeve 96 can be adjusted by simply rotating the adapter sleeve with respect to the flange. Also, the cables 88 themselves are preferably attached to their respective drive mechanisms 30, 26 via a tensioning device so that the tension or compression of the cable between the drive wheel 86 and the drive mechanism can be adjusted. Such a tensioning device may take the form of a threaded spool having provisions for fixing the cable to the spool and being rotatable to tighten or loosen the tension of the cable.

As shown in FIG. 16b, rotation of the larger disc portion 90 of the drive wheel 86 in a clockwise direction will cause one of the pair of X cables (the cable on the left side of FIG. 16b) to pull the X drive mechanism 30 in an X direction (to the left in FIG. 16b). At the same time, the smaller disc portion 92 of the drive wheel 86 will rotate in the clockwise direction causing one of the pair of Y cables (the cable on the top side of FIG. 16b) to pull the Y drive mechanism 26 in a Y direction (toward the top of FIG. 16b). Similarly, rotation of the larger disc portion 90 of the drive wheel 86 in a counter-clockwise direction, as shown in FIG. 16c, will cause the other of the pair of X cables (the cable on the right side of FIG. 16c) to pull the X drive mechanism 30 in an opposite X direction (to the right in FIG. 16c), while the smaller disc portion 92 of the drive wheel 86 will cause the other of the pair of Y cables (the cable on the bottom side of FIG. 16c) to pull the Y drive mechanism 26 in an opposite Y direction (toward the bottom of FIG. 16a). However, due to the differences in the diameters of the larger and smaller disc portions 90, 92 of the drive wheel, the distance traveled by the X drive mechanism will be proportionately greater as compared to the distance traveled by the Y drive mechanism 26, wherein the proportion is based on the ratio of the diameters of the two disc portions 90, 92.

FIGS. 17a, 17b and 17c show an alternative embodiment of a drive system using the cables 88. In this embodiment, one of each pair of cables 88 is attached to a respective drive mechanism, as described above. This cable is also surrounded by a sleeve 96, which is fixedly attached between the cable drive bracket 84 of the actuator and a fixed cable guide flange 100 of the base plate. Operation of this cable is the same as described above to pull its respective drive mechanism in one direction.

However, the other of each pair of cables is attached to an anchor flange 102 fixed to the base plate 12 on the side of the drive mechanism 30 opposite the cable guide flange 100. Also, this fixed end cable 88x' is sheathed within a semi-rigid cable sleeve 96' which is connected between the cable guide bracket 84 of the actuator and the respective drive mechanism 30. This semi-rigid cable sleeve 96' is similar to the cable sleeves described above, but has enough rigidity so as not to collapse under compression in the axial direction. The rigidity of this sleeve 96' is necessary so that the sleeve will be able to provide a pushing force on the drive mechanism 30, as will be described in further detail below. Also, attachment of this cable sleeve 96' is preferably achieved via a threaded adapter 98, as described above, so that tension or compression of the sleeve 96' can be adjusted as may be needed to achieve a robust operation.

Thus, as shown in FIG. 17b, rotation of the larger disc portion 90 of the drive wheel 86 in a clockwise direction will cause the length of the fixed end cable 88x'(the cable on the left side of FIG. 17b) between the anchor 102 and the drive wheel 86 to decrease. As the relative length of the fixed end cable 88x' decreases, the semi-flexible cable sleeve 96' attached directly to the X drive mechanism 30 pushes the X drive mechanism 30 in an X direction (to the left in FIG. 17b). This is due to the fixed length of the semi-flexible cable sleeve 96' surrounding the decreasing relative length of the fixed end cable 88x'.

Rotation of the larger disc portion 90 of the drive wheel 86 in a counter-clockwise direction, as shown in FIG. 17c, will cause the other 88x of the pair of X cables (the cable on the right side of FIG. 17c) to pull the X drive mechanism 30 in an opposite X direction (to the right in FIG. 17c). FIGS. 17a, 17b and 17c only show a pair of X cables 88x, 88x', but it can be appreciated that Y cables 88y, 88y' attached to the smaller disc portion 92 of the drive wheel and Y cable sleeves 96, 96' can be provided, which will operate in a similar manner.

As described above, and shown in isometric view of FIG. 18, the Y linear drive mechanism 26 is connected to the Y scissors assembly 28, which, in turn, is connected to the X rails 14. The X linear drive mechanism 30 is connected to the X scissors assembly 32, which, in turn, is connected to the Y rails 16. When driven by their respective cables 88, the Y drive mechanism 26 collapses or extends the Y scissors 28 in the Y direction for moving the X rails 14 in the Y direction, while the X drive mechanism 30 collapses or extends the X scissors 32 in the X direction for moving the Y rails 16 in the X direction for the purpose of uniform motion and driving force distribution as needed.

Figure 18:
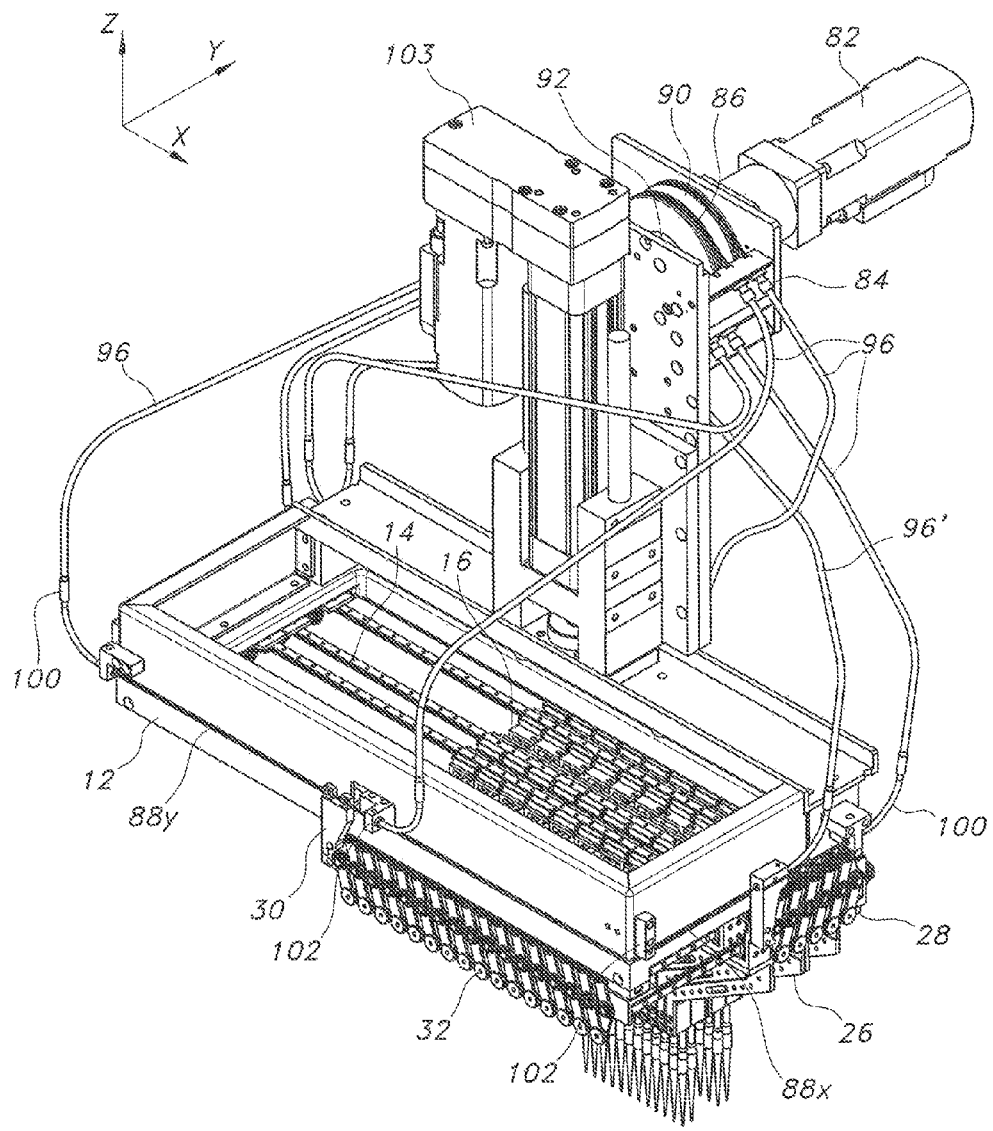
FIG. 18 is a perspective view of the handling device of the present invention utilizing both alternative embodiments of the drive systems shown in FIGS. 16a, 16b, 16c, 17a, 17b and 17c.

The rotary drive motor 82 can be any conventional motor, and is preferably fixedly supported on the base table 12 at any location which allows convenient routing of the cables 88 and sleeves 96. Selection of the first embodiment, shown in FIGS. 16*a*, 16*b* and 16*c*, or the second embodiment, shown in FIGS. 17*a*, 17*b* and 17*c*, can be determined based on space constraints or other physical parameters. A combination of both embodiments, as shown in FIG. 18, is also entirely conceivable.

In this arrangement, the motor 82 with drive wheel 86 is attached to a support plate at the top of the Z axis. The support plate can also support a Z-stage 103, which drives the base plate table 12 in the vertical direction. For driving the Y rails 16 in the X direction, the cable sleeves 96 are attached on one side to cable guide flanges 100, which in turn are attached to the base plate 12. At their opposite ends, these cable sleeves 96 are attached to the cable guide bracket 84 located near the drive wheel 86, preferably in the direction tangent to the large disc portion 90. The cables 88*y* within these cable sleeves 96, which drive the Y rails 16 in the X direction, are attached to the Y drive mechanism 30 on one side and to the large disc 90 on the other side.

Similarly, yet in the slightly different configuration shown in FIGS. 17*a*, 17*b* and 17*c*, for driving the X rails 14 in the Y direction, with smaller disc portion 92, one end of each set of cable sleeves 96 is attached to cable guide flanges 100, which in turn are attached to the base plate 12, The other end of these cable sleeves 96 are attached to the bracket 84 near the drive wheel 86 and the smaller disc portion 92, preferably in the direction tangent to the smaller disc 92. The second set of cable sleeves 96' are directly attached to the Y drive mechanism 26, on one side, and to the bracket near the drive wheel 88, preferably in the direction tangent to the smaller disc 92. The cable 88*x*' within this cable sleeve 96', which drive the X rails 14 in the Y direction are attached to the fixed anchor 102 on the base plate 12 on one side and the small disc 90 on the other side.

Both sets of cable wires 88 attached to the smaller disc portion 92 and both sets of cables 88 attached to the larger disc portion 90 traverse freely within their respective cable sleeves 96. Each sleeve 96 preferably has a differently sized cable guide portion respectively matching the diameters in order to minimize friction between the cable which freely transverse within its respective sleeve and the sleeve itself. Thus, the arrangement described will result in the set of cables 88 around the base table 12, which is capable of driving the rails in their X and Y direction. It should be noted that the tension in the wires must be set to be higher than the friction and the inertial forces which resist rail motion. Tension is set by both pulling the wires to a preset value before anchoring them to their posts, as well as with pressing the sleeves against their anchoring posts with a nut.

As described above, due to the difference in diameters of the disc portions 90, 92, the X rails 14 and the Y rails 16 will move a different distance upon each rotation of the drive wheel 86. As a result, the spacing between the X rails 14 at any given time will always be different than the spacing between the Y rails 16, and the respective spacings can be continuously varied. It is also possible to change the relationship between the X rails 14 and between the Y rails 16 by replacing the drive wheel 88 with a drive wheel having disc portions 90, 92 with different diameters. As the difference between the diameters of the disc portions increases, the differential between the spacing of the X rails 14 and the spacing of the Y rails 16 also increases.

Figure 19:
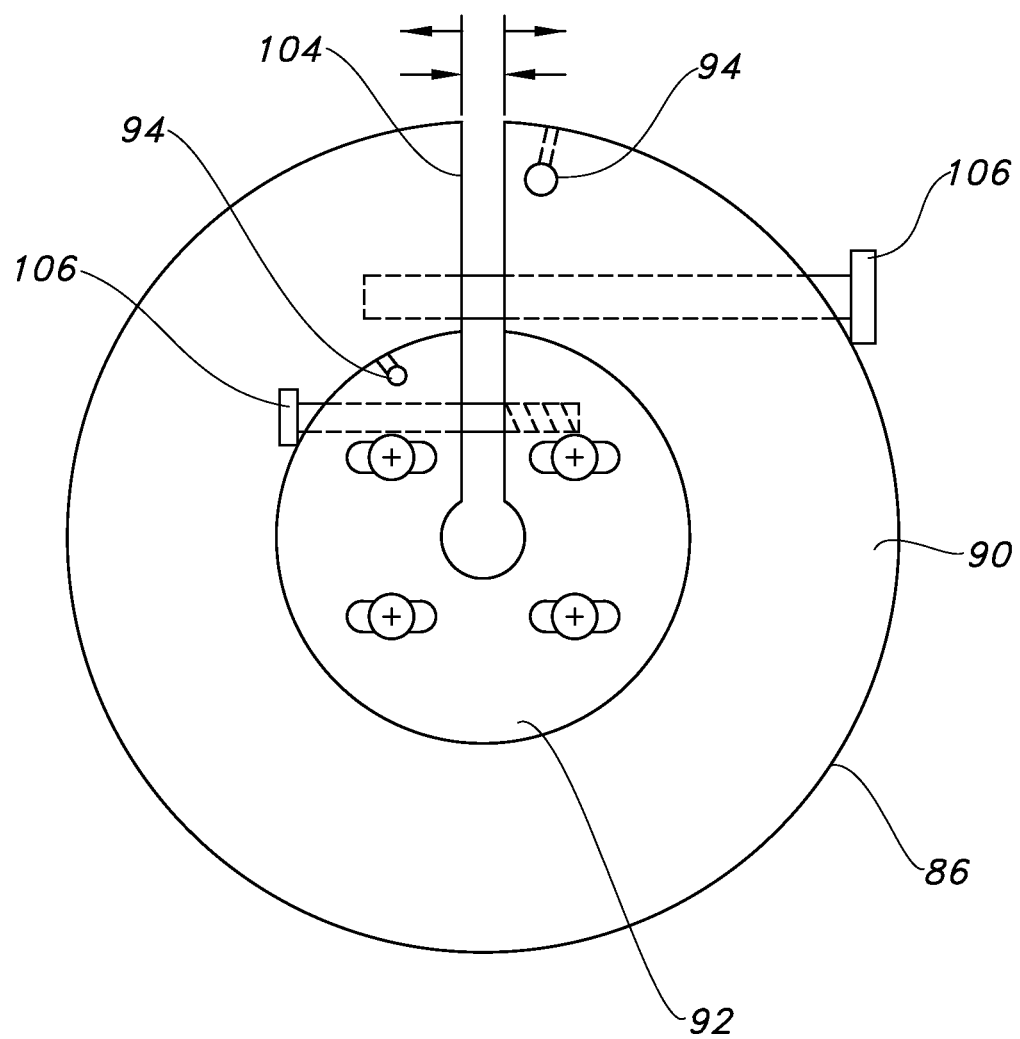
FIG. 19 is a detailed end view of the drive wheel of the rotary drive assembly shown in FIGS. 13-15.

FIG. 19 shows a feature of the drive wheel that allows fine tune adjustment of the travel of the X drive mechanism 26 with respect to the Y drive mechanism 30. Each of the larger and smaller disc portions 90, 92 of the drive wheel 86 has a radial slot 104 formed axially therethrough. The slot 104 permits the circumference of its respective disc portion to increase or decrease by, respectively, expanding or decreasing the width of the slot. The width of the slot 104 can be expanded or decreased by respectively radially expanding radially compressing the respective disc portion. Such radial expansion and compression can be accomplished via a pair of adjusting screws 106 provided in each disc portion 90, 92.

The adjusting screws 106 of each pair face in opposite directions and penetrate their respective disc portions in a radial direction across the slots 104. Ends of the screws 106 threadably engage a respective threaded hole formed in the interior of the disc portions on one side of the slot. Thus, rotation of the adjusting screws in one direction will compress the disc portion, thereby decreasing the width of the slot 104. Rotation of the screw in the opposite direction will expand the disc portion, thereby increasing the width of the slot.

The width of the slots of each of the larger and smaller disc portions can be adjusted independently to thereby independently increase or decrease the distance of travel of the respective X and Y drive mechanisms. Preferably, the slots allow for a +/−5 mm distance adjustment.

Figure 20:
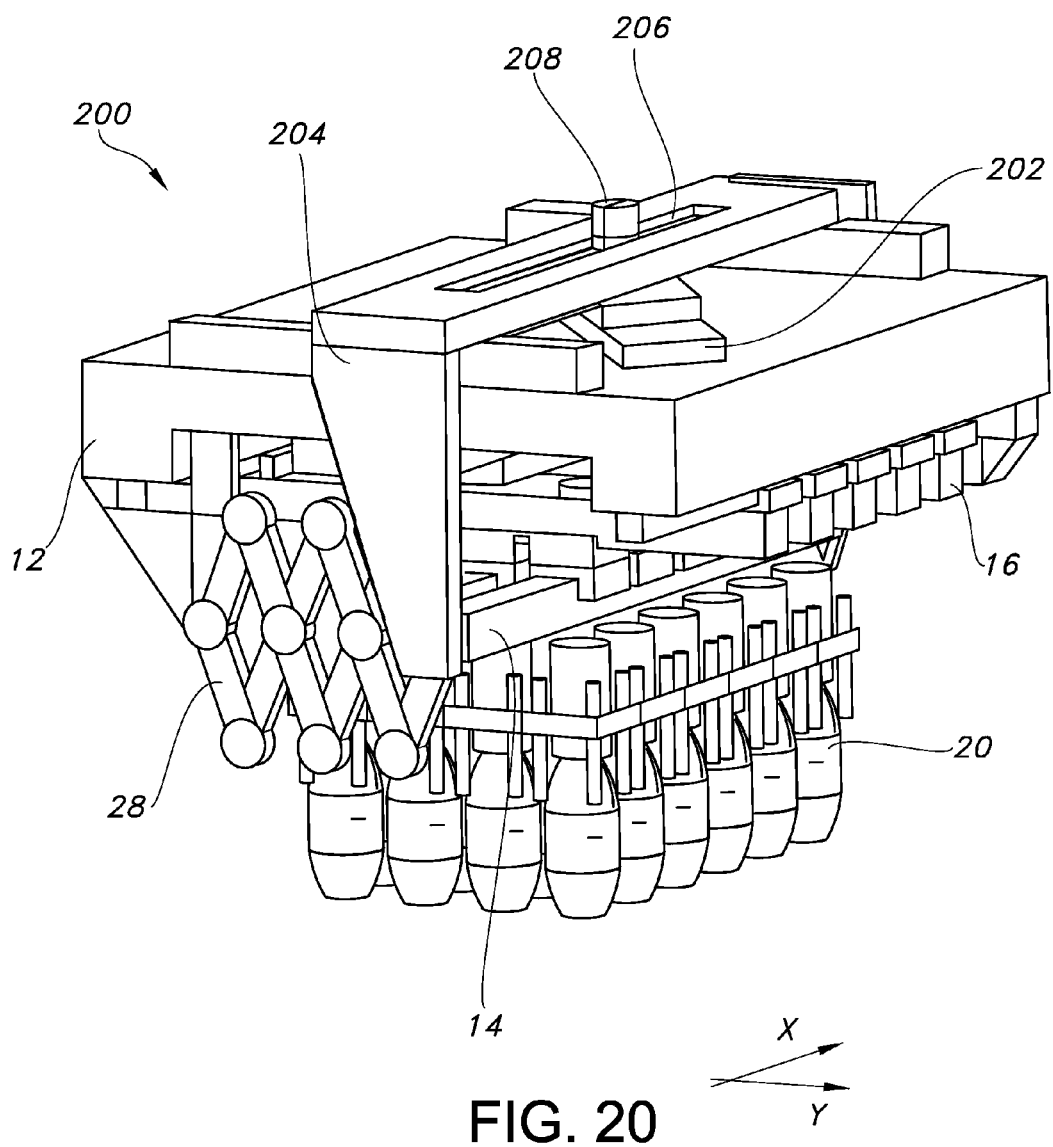
FIG. 20 is a perspective view of another alternative embodiment of a single linear actuator drive system according to the present invention.

FIG. 20 shows still another variant of the present invention, wherein only a single actuator is used to drive both the X rails and Y rails. The handling device 200 shown in FIG. 20 includes a base plate 12, X rails 14, Y rails 16, scissors assemblies 28, 32 and gripper transfer devices 20, as described above. However, this handling device 200 includes only a single actuator 202, (shown schematically in FIG. 20), for driving the X rails 14 and the Y rails 16. The actuator 202 can be any conventional linear drive mechanism, but is oriented at an angle between 10 and 80 degrees with respect to the X and Y rails to simultaneously drive the two scissors in the X and Y direction with a fixed ratio between the pitch in the X direction and the pitch in the Y direction.

The actuator 202 is coupled to specially designed drive mechanisms 204, which, in turn, are connected to the Y scissors 28 and the X scissors 32. A Y drive mechanism 204 is movably supported on the base plate 12 to traverse in the Y direction and is coupled to the Y scissors for collapsing and retracting the Y scissors as the drive mechanism traverses in the Y direction. This drive mechanism 204 further includes an elongate slot 206 extending in the X direction perpendicular to the direction of travel of the drive mechanism. An X drive mechanism 204 is movably supported on the base plate 12 to traverse in the X direction and is coupled to the X scissors for collapsing and retracting the Y scissors as the drive mechanism traverses in the X direction. This X drive mechanism 204 further includes an elongate slot 206 extending in the Y direction attached to one of the Y rails 16 (not shown in FIG. 20) perpendicular to the direction of travel of the drive mechanism.

The angularly oriented actuator 202 includes a movable drive element 208 slidably disposed in each slot of the drive mechanisms. Thus, when the drive element 208 is driven at an angle with respect to the direction of the X and Y rails, the drive element will engage the drive mechanisms, wherein the X and Y direction orientation of the slots of the drive mechanisms will simultaneously move the drive mechanisms in their respective directions.

As a result of the present invention, a robot may move the handling device, 10, 70, 200 to a position to pick up work pieces, for example bottles, of one size with X Y grippers mounted on the handling device and use the same device with different spacing transfer device spacings to pick up differently sized bottles. The value is the saving of plant downtime which may otherwise be required to change the tool which holds the grippers every time a bottle size is changed. It also reduces the amount of dedicated tooling. The design offers significant advantages in addition to the accuracy of movement, reliability, reduction in cost of the process and efficiency.

Although the preferred embodiments of the present invention have been described with reference to the accompanying drawing, it is to be understood that the invention is not limited to those precise embodiments, and that other changes and modifications may be made by one skilled in the art without departing from the scope or spirit of the invention.

What is claimed is:

1. A handling device comprising:
   a base plate defining an X-Y plane;
   a plurality of X rails movably supported on said base plate and extending in an X-direction;
   a plurality of Y rails movably supported on said base plate and extending in a Y-direction perpendicular to said X-direction;
   a puck assembly movably coupled between each X rail and each Y rail at an intersection thereof, each puck assembly including an X slide slidably coupled to said X rail and a Y slide slidably coupled to said Y rail;
   a transfer device supported by said puck assembly for manipulating work;
   an X servo motor device mounted to said base plate for moving said Y rails in said X-direction;
   a Y servo motor device mounted to said base plate for moving said X rails in said Y direction;
   an X scissors assembly connected between said X servo motor device and said plurality of Y rails, said X servo motor device extending and collapsing said X scissors assembly in the X direction for alternately, respectively increasing the spacing between said Y rails and decreasing the spacing between said Y rails; and
   a Y scissors assembly connected between said Y servo motor device and said plurality of X rails, said Y servo motor device extending and collapsing said Y scissors assembly in the Y direction for alternately, respectively increasing the spacing between said X rails and decreasing the spacing between said X rails,
   wherein said X servo motor device has servo control for precise variable positioning, and wherein said Y servo motor device has servo control for precise variable positioning, said X servo motor device being operable independently of said Y servo motor device for moving said Y rails independent of said X rails to continuously variably extend or collapse said Y rails to any desired position between a fully extended position, wherein the spacing between said Y rails is a maximum, and a fully collapsed position, wherein the spacing between said Y rails is a minimum such that a spacing between said X rails varies as said X rails move, and wherein a spacing between said Y rails varies as said Y rails move, and wherein the spacing between said X-rails is continuously variable with respect to the spacing between said Y rails.

2. A handling device as defined in claim 1, wherein each of said X and Y scissors assemblies comprises a plurality of elongate link members pivotably connected with each other at mid-point intersections thereof, said X and Y rails being connected to said respective X and Y scissors assemblies at said mid-point intersections of said elongate members.

3. A handling device as defined in claim 2, wherein at least one of said X and Y scissors assemblies is respectively connected to ends of said X and Y rails.

4. A handling device as defined in claim 2, wherein at least one of said X and Y scissors assemblies is respectively connected to mid points of said X and Y rails.

5. A handling device as defined in claim 1, wherein said transfer device is selected from the group consisting of a gripper, a pipette, a nozzle, a tool and a sensor.

6. A handling device as defined in claim 1, further comprising:
   a plurality of stationary rails disposed on said base plate; and
   at least one slide fixed on each of said X-rails and Y-rails, said slide being slidably coupled to a stationary rail for movably supporting said X-rails and said Y-rails on said base plate.

7. A handling device comprising:
   a base plate defining an X-Y plane;
   a plurality of X rails movably supported on said base plate and extending in an X-direction;
   a plurality of Y rails movably supported on said base plate and extending in a Y-direction perpendicular to said X-direction; and
   a drive system supported on said base plate for moving said X rails in said Y-direction and for moving said Y rails in said X-direction;
   a puck assembly movably coupled between each X rail and each Y rail at an intersection thereof;
   a transfer device supported by said puck assembly for manipulating work; and
   an angled bracket connected between said puck assembly and said transfer device, said angled bracket including an arm extending away from said puck assembly for positioning said transfer device toward a center of said X and Y rails,
   wherein a spacing between said X rails varies as said X rails move, and wherein a spacing between said Y rails varies as said Y rails move, and wherein the spacing between said X-rails is continuously variable with respect to the spacing between said Y rails.

8. A handling device comprising:
   a base plate defining an X-Y plane;
   a plurality of X rails movably supported on said base plate and extending in an X-direction;
   a plurality of Y rails movably supported on said base plate and extending in a Y-direction perpendicular to said X-direction;
   a drive system supported on said base plate for moving said X rails in said Y-direction and for moving said Y rails in said X-direction;
   a puck assembly movably coupled between each X rail and each Y rail at an intersection thereof; and
   a transfer device supported by said puck assembly for manipulating work,
   wherein a spacing between said X rails varies as said X rails move, and wherein a spacing between said Y rails varies as said Y rails move, and wherein the spacing between said X-rails is continuously variable with respect to the spacing between said Y rails, and
   wherein the puck assembly comprises an X slide slidably coupled to said X rail and a Y slide slidably coupled to said Y rail, and wherein said puck assembly further comprises a rigid U-shaped link having two parallel legs extending perpendicularly from a cross leg, one of said two parallel legs having said X slide mounted thereto, said cross leg having said Y slide mounted thereto and the other of said two parallel legs having said transfer device mounted thereto.

9. A handling device as defined in claim 8, wherein the drive system comprises:
an X positioning table mounted to said base plate for moving said Y rails in said X direction; and
a Y positioning table mounted to said base plate for moving said X rails in said Y direction, said Y positioning table being operable independently of said X positioning table for moving said X rails independent of said Y rails.

10. A handling device as defined in claim 9, wherein said X positioning table comprises an X linear actuator having servo control for precise variable positioning, and wherein said Y positioning table comprises a Y linear actuator having servo control for precise variable positioning, said X linear actuator being operable independently of said Y linear actuator for moving said Y rails independent of said X rails to continuously variably extend or collapse said Y rails to any desired position between a fully extended position, wherein the spacing between said Y rails is a maximum, and a fully collapsed position, wherein the spacing between said Y rails is a minimum.

11. A handling device as defined in claim 10, wherein said X linear actuator is a servo motor device.

12. A handling device as defined in claim 8, wherein said drive system comprises a single actuator for driving both of said X rails and said Y rails.

13. A handling device comprising:
a base plate defining an X-Y plane;
a plurality of X rails movably supported on said base plate and extending in an X-direction;
a plurality of Y rails movably supported on said base plate and extending in a Y-direction perpendicular to said X-direction; and
a drive system supported on said base plate for moving said X rails in said Y-direction and for moving said Y rails in said X-direction,
wherein a spacing between said X rails varies as said X rails move, and wherein a spacing between said Y rails varies as said Y rails move, and
wherein said drive system comprises:
a motor supported on said base plate; and
at least one X cable connected between said motor and said plurality of Y rails for moving said Y rails in said X direction; and
at least one Y cable connected between said motor and said plurality of X rails for moving said X rails in said Y direction.

14. A handling device as defined in claim 13, further comprising:
an X scissors assembly connected between said drive system and said plurality of Y rails, said drive system extending and collapsing said X scissors assembly in the X direction for alternately, respectively increasing the spacing between said Y rails and decreasing the spacing between said Y rails; and
a Y scissors assembly connected between said drive system and said plurality of X rails, said drive system extending and collapsing said Y scissors assembly in the Y direction for alternately, respectively increasing the spacing between said X rails and decreasing the spacing between said X rails.

15. A handling device as defined in claim 13, further comprising:
a puck assembly movably coupled between each X rail and each Y rail at an intersection thereof; and
a transfer device supported by said puck assembly for manipulating work.

16. A handling device as defined in claim 15, wherein the puck assembly comprises an X slide slidably coupled to said X rail and a Y slide slidably coupled to said Y rail.

17. A handling device as defined in claim 13, wherein said motor comprises a rotating drive wheel having a first disc portion with a first diameter and a second disc portion coaxially arranged with said first disc portion and having a second diameter, the first diameter being different than the second diameter, and wherein said X cable is attached to said first disc portion and said Y cable is attached to said second disc portion.

18. A handling device as defined in claim 13, wherein said drive system comprises at least one pair of said X cables having one end attached to said motor and having an opposite end connected to said plurality of Y rails via a linear X drive mechanism, said opposite ends of said at least one pair of said X cables being respectively attached to opposite sides of said linear X drive mechanism for alternately pulling said X drive mechanism in opposite X directions.

19. A handling device as defined in claim 13, wherein said drive system comprises a first X cable, a second X cable, and a semi-rigid sleeve substantially surrounding a length of said second X cable,
said first X cable having one end attached to said motor and having an opposite end connected to said plurality of Y rails via a linear X drive mechanism, said opposite end of said first X cable being attached to a side of said linear drive mechanism for pulling said linear X drive mechanism in a first X direction, and
said second X cable having one end attached to said motor and having an opposite end attached to said base plate, and
said semi-rigid sleeve having one end fixed adjacent said motor and having an opposite end fixed to said side of said linear drive mechanism for pushing said linear drive mechanism in a second X direction opposite said first X direction.

20. A handling device as defined in claim 13, wherein said drive system further comprises at least one semi-rigid sleeve substantially surrounding a length of at least one of said X cable and said Y cable, said sleeve having one end fixed adjacent said motor and having an opposite end fixed to said base plate for guiding said at least one of said X cable and said Y cable.

21. A handling device comprising:
a base plate defining an X-Y plane;
a plurality of X rails movably supported on said base plate and extending in an X-direction;
a plurality of Y rails movably supported on said base plate and extending in a Y-direction perpendicular to said X-direction; and
a drive system supported on said base plate for moving said X rails in said Y-direction and for moving said Y rails in said X-direction,
wherein a spacing between said X rails varies as said X rails move, and wherein a spacing between said Y rails varies as said Y rails move, and wherein the spacing between said X-rails is continuously variable with respect to the spacing between said Y rails, and
wherein said drive system comprises a single actuator for driving both of said X rails and said Y rails, and wherein said single actuator comprises a drive element movable at an angle offset from the X and Y directions.

* * * * *